United States Patent
Seo et al.

(10) Patent No.: US 9,699,806 B2
(45) Date of Patent: Jul. 4, 2017

(54) METHOD AND DEVICE FOR RETRANSMITTING UPLINK DATA IN WIRELESS COMMUNICATION SYSTEM

(71) Applicant: LG ELECTRONICS INC., Seoul (KR)

(72) Inventors: Daewon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 14/411,258

(22) PCT Filed: Jul. 25, 2013

(86) PCT No.: PCT/KR2013/006677
§ 371 (c)(1),
(2) Date: Dec. 24, 2014

(87) PCT Pub. No.: WO2014/017850
PCT Pub. Date: Jan. 30, 2014

(65) Prior Publication Data
US 2015/0146642 A1   May 28, 2015

Related U.S. Application Data

(60) Provisional application No. 61/675,805, filed on Jul. 25, 2012.

(51) Int. Cl.
*H04W 72/14* (2009.01)
*H04L 1/08* (2006.01)
(Continued)

(52) U.S. Cl.
CPC ........... *H04W 72/14* (2013.01); *H04L 1/0003* (2013.01); *H04L 1/0026* (2013.01); *H04L 1/06* (2013.01);
(Continued)

(58) Field of Classification Search
None
See application file for complete search history.

(56) References Cited

U.S. PATENT DOCUMENTS

| | | | |
|---|---|---|---|
| 2011/0021203 A1* | 1/2011 | Yamada | H04L 1/00 455/450 |
| 2012/0120909 A1 | 5/2012 | Ng | |
| 2013/0070693 A1* | 3/2013 | Kwon | H04L 5/001 370/329 |

OTHER PUBLICATIONS

Huawei et al., "PHICH enhancement for CoMP Scenario 4", 3GPP TSG RAN WG1 Meeting #68, R1-120125, Dresden, Germany, Feb. 6-10, 2012, 4 pages.

(Continued)

*Primary Examiner* — Huy D Vu
*Assistant Examiner* — Hong Shao
(74) *Attorney, Agent, or Firm* — Birch, Stewart, Kolasch & Birch, LLP

(57) ABSTRACT

The present invention relates to a wireless communication system. Particularly, the present invention provides a method for enabling a user equipment (UE) to retransmit uplink data on the basis of a signal received through a physical hybrid ARQ indicator channel (PHICH) in a wireless communication system and a device for the same, and the method for retransmitting uplink data comprises the steps of: receiving, from a base station, an indication on whether or not to detect the PHICH; retransmitting the uplink data on the basis of a PHICH detection result if the received indication is to detect the PHICH; and retransmitting the uplink data on the basis of an uplink grant received from the base station if the received indication is not to detect the PHICH.

9 Claims, 13 Drawing Sheets

(51) Int. Cl.
| | |
|---|---|
| *H04L 1/00* | (2006.01) |
| *H04L 5/00* | (2006.01) |
| *H04L 1/06* | (2006.01) |
| *H04L 1/18* | (2006.01) |

(52) U.S. Cl.
CPC .............. *H04L 1/08* (2013.01); *H04L 1/1887* (2013.01); *H04L 1/1896* (2013.01); *H04L 5/0053* (2013.01); *H04L 5/0055* (2013.01)

(56) References Cited

OTHER PUBLICATIONS

Huawei et al.,"On the need for ePHICH and ePCFICH", 3GPP TSG RAN WG1 Meeting #69, R1-121968, Prague, Czech Republic, May 21-25, 2012, 4 pages.

Panasonic, "The necessity of enhanced PHICH", 3GPP TSG RAN WG1 Meeting #69, R1-122207, Prague, Czech Republic, May 21-25, 2012, pp. 1-5 (6 pages total).

Texas Instruments, "Discussion on Different TDD UL-DL Configurations in CA", 3GPP TSG RAN WG1 #67, R1-113780, San Francisco, USA, Nov. 14-18, 2011, pp. 1-4 (5 pages total).

* cited by examiner

FIG. 12
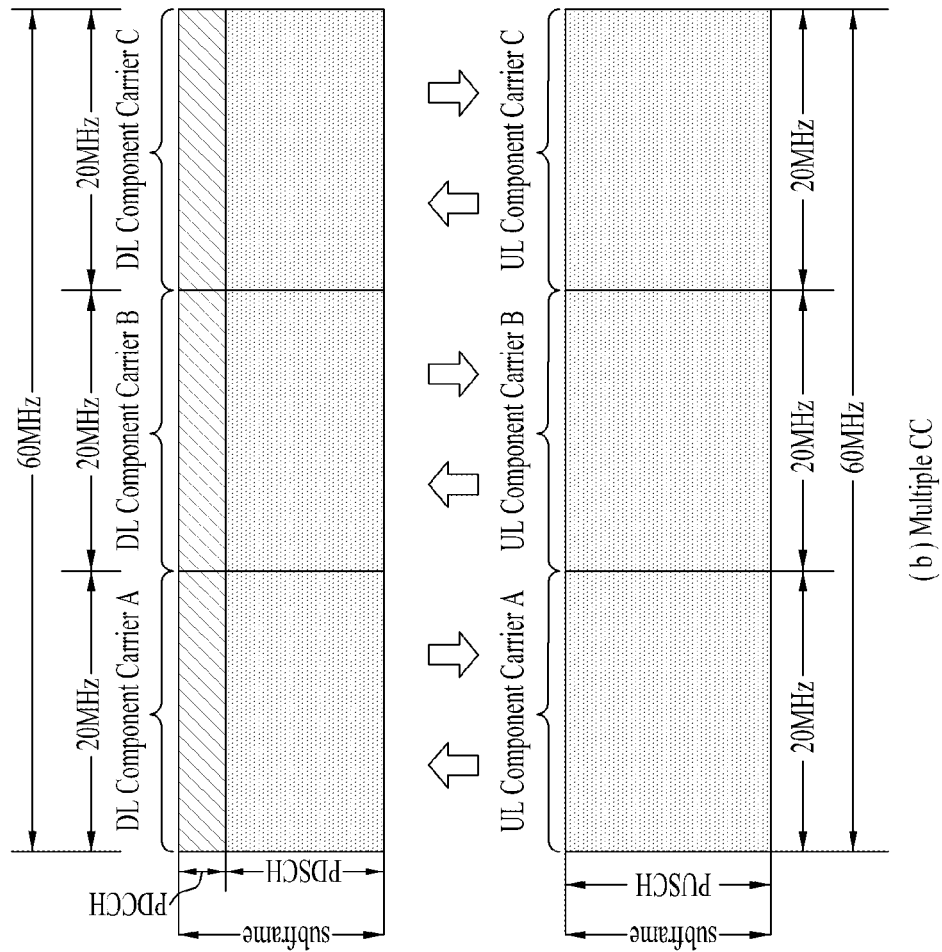
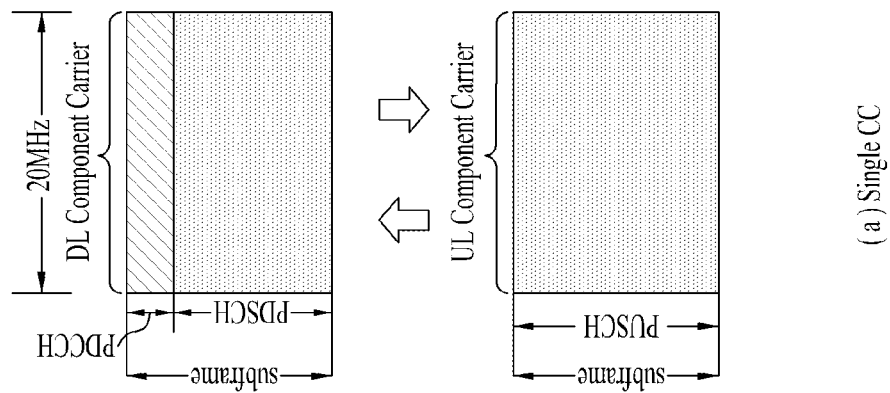

FIG. 14
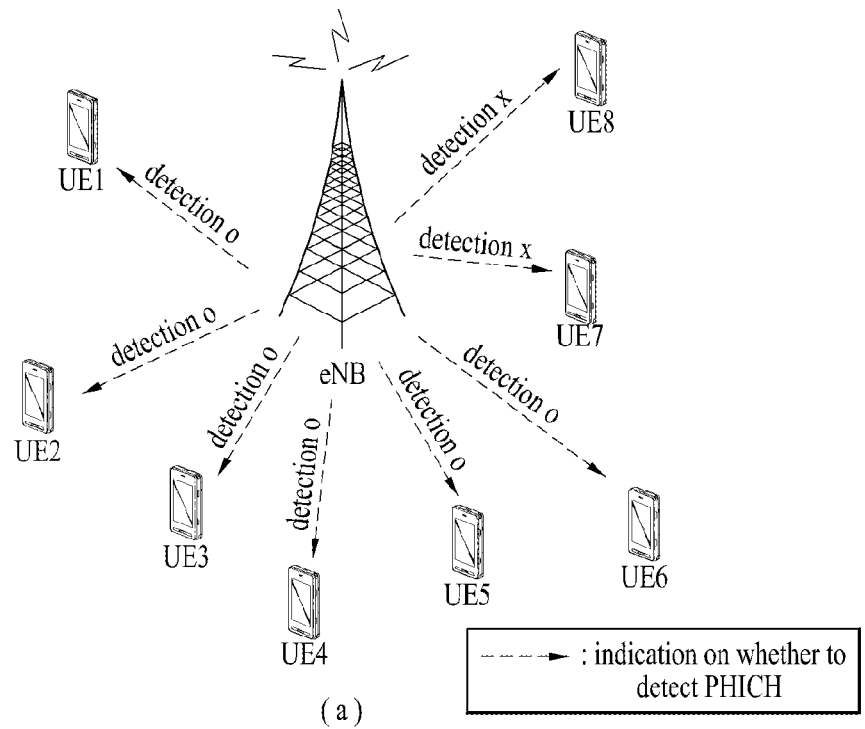
(a)
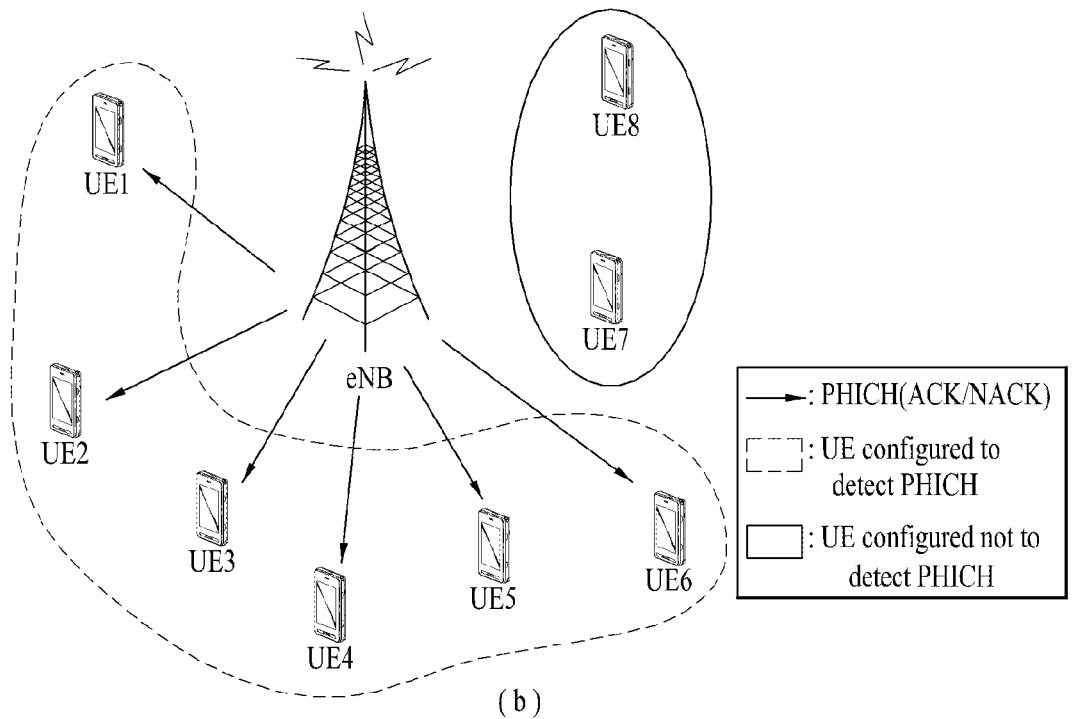
(b)

METHOD AND DEVICE FOR RETRANSMITTING UPLINK DATA IN WIRELESS COMMUNICATION SYSTEM

CROSS REFERENCE TO RELATED APPLICATIONS

This application is the National Phase of PCT/KR2013/006677 filed on Jul. 25, 2013, which claims priority under 35 U.S.C. 119(e) to U.S. Provisional Application No. 61/675,805 filed on Jul. 25, 2012, all of which are hereby expressly incorporated by reference into the present application.

TECHNICAL FIELD

The present invention relates to a wireless communication system, and more particularly, to a method of retransmitting uplink data, which is retransmitted by a user equipment based on a signal received via a physical hybrid automatic repeat request (hybrid ARQ or HARQ) indicator channel (PHICH), and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

An object of the present invention is to provide a method for a UE (user equipment) to retransmit uplink data in a wireless communication system and an apparatus therefor. Another object of the present invention is to provide a method of indicating resources respectively allocated to a plurality of UEs without overhead and an apparatus therefor. The other object of the present invention is to provide a method of efficiently allocating a resource to a plurality of UEs and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of retransmitting an uplink data, which is retransmitted by a user equipment based on a signal received via PHICH (physical hybrid ARQ indicator channel) in a wireless communication system, includes the steps of receiving an indication on whether to detect the PHICH from an eNode B, if the received indication corresponds to an indication configured to detect the PHICH, retransmitting the uplink data based on a detection result of the PHICH and if the received indication corresponds to an indication configured not to detect the PHICH, retransmitting the uplink data based on a uplink grant received from the eNode B.

To further achieve these and other advantages and in accordance with the purpose of the present invention, according to a different embodiment, a user equipment retransmitting an uplink data based on a signal received via PHICH (physical hybrid ARQ indicator channel) in a wireless communication system includes a radio frequency (RF) unit and a processor configured to control the RF unit, the processor configured to receive an indication on whether to detect the PHICH from an eNode B, the processor, if the received indication corresponds to an indication configured to detect the PHICH, configured to retransmit the uplink data based on a detection result of the PHICH, the processor, if the received indication corresponds to an indication configured not to detect the PHICH, configured to retransmit the uplink data based on a uplink grant received from the eNode B.

Preferably, the indication on whether to detect the PHICH is performed via a cyclic shift value for a DM-RS (demodulation reference signal) and the cyclic shift value is included in the uplink grant received from the eNode B.

And, if the cyclic shift value corresponds to a value within a prescribed range, the indication on whether to detect the PHICH may correspond to the indication configured to detect the PHICH and if the cyclic shift value corresponds to a value outside of the prescribed range, the indication on whether to detect the PHICH may correspond to the indication configured not to detect the PHICH.

Preferably, the indication on whether to detect the PHICH is performed via a MCS (modulation coding scheme) value and the MCS value is included in the uplink grant received from the eNode B.

And, if the MCS value is less than a prescribed numerical value, the indication on whether to detect the PHICH may correspond to the indication configured to detect the PHICH and if the MCS value exceeds the prescribed numerical value, the indication on whether to detect the PHICH may correspond to the indication configured not to detect the PHICH.

Preferably, the indication on whether to detect the PHICH can be performed via an RRC (radio resource control) signal received from the eNode B.

And, if the RRC signal indicates to detect the PHICH, the method can further include the steps of receiving an indication on a prescribed CC (component carrier) and a prescribed subframe from the eNode B and detecting the PHICH in the prescribed subframe of the prescribed CC. The prescribed CC and the prescribed subframe can be determined by the eNode B based on interference coordination with a neighboring eNode B.

Advantageous Effects

According to the present invention, a UE (user equipment) can more precisely perform an uplink data retransmission operation in a wireless communication system. And, a radio resource can be efficiently distributed to a plurality of UEs in a wireless communication system. And, a radio resource distributed to a plurality of UEs can be indicated to a UE without overhead.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 1 (b) is a diagram for a structure of a type 2 radio frame;

FIG. 12 is a diagram for explaining a single carrier communication and a multi carrier communication;

FIG. 14 is a diagram for a method of solving a problem capable of being occurred when a PHICH resource is deficient according to one embodiment of the present invention;

BEST MODE

Mode for Invention

Figure 1:
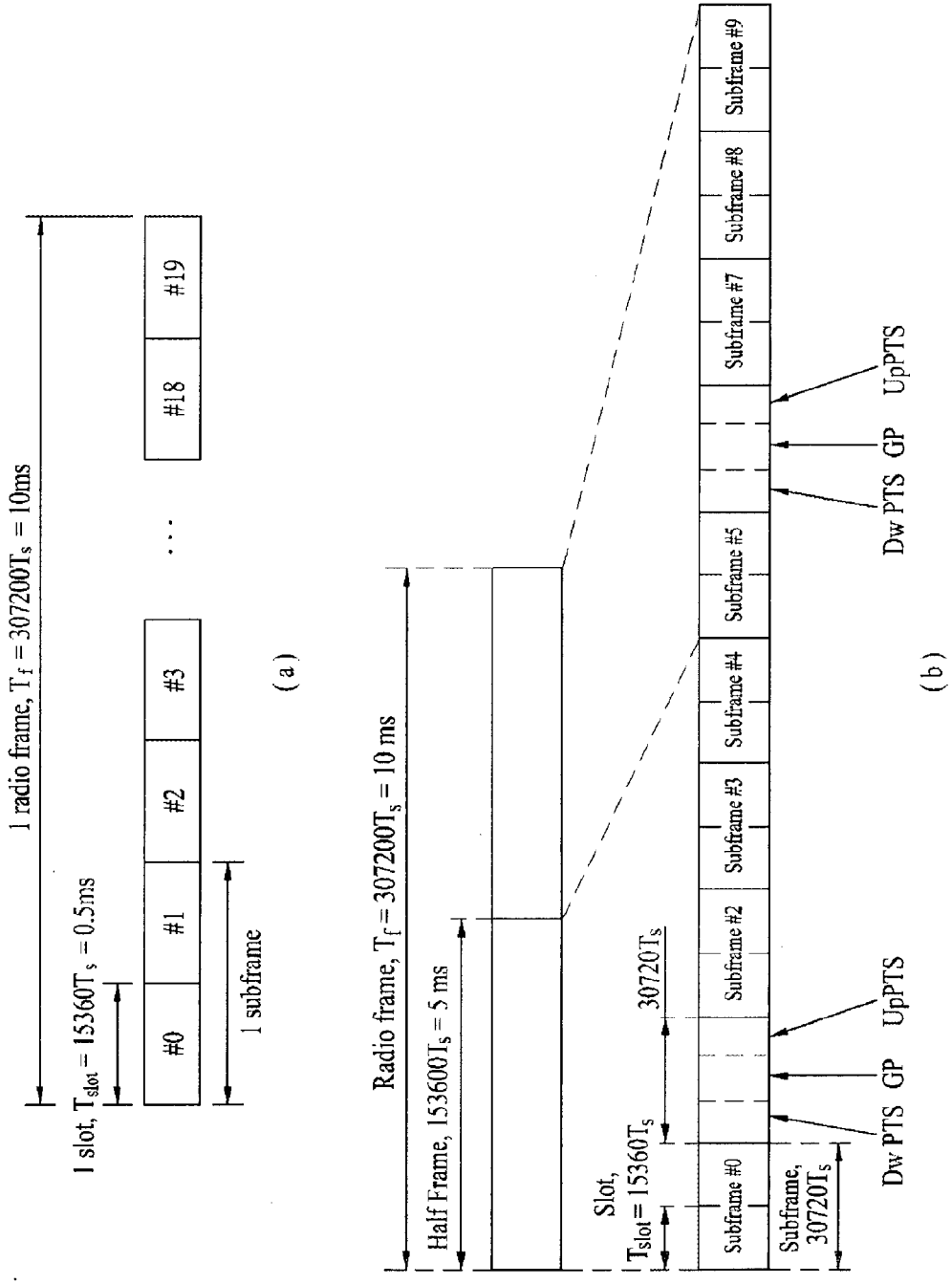
FIG. 1 (a) is a diagram for a structure of a type 1 radio frame.

Reference will now be made in detail to the preferred embodiments of the present invention, examples of which are illustrated in the accompanying drawings. Detail explanation disclosed in the following description together with the attached drawings is intended to explain exemplary embodiment of the present invention and it is not intended to indicate a unique embodiment by which the present invention is implemented. The following detailed description includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

For clarity, although detail embodiments of the present invention are explained based on 3GPP ($3^{rd}$ generation partnership project) LTE (long term evolution) or 3GPP LTE-A (LTE advanced), the present invention can be applied to not only LTE/LTE-A system but also a different wireless communication system.

In the following description of the present invention, a user equipment (UE) may be stationary or may have mobility. Various devices transceiving a user data and/or various control information bel with a base station (BS) belong to the user equipment. The UE may be named one of a terminal equipment, a mobile station (MS), a mobile terminal (MT), a user terminal (UT), a subscriber station (SS), a wireless device, a personal digital assistant (PDA), a wireless modem, a handheld device and the like. And, in the following description of the present invention, a base station generally means a fixed station communicating with a user equipment and/or other base stations and exchanges various kinds of data and control informations by communicating with a user equipment and other base stations. The base station may be named such a terminology as an advanced base station (ABS), a Node-B (NB), an evolved-Node B (eNB), a base transceiver system (BTS), an access point (AP), a processing server (PS) and the like. In the following description, the BS is commonly called an eNB.

In the present invention, a node indicates a fixed point capable of transmitting/receiving a radio signal by communicating with a UE. Various types of eNBs can be used as a node irrespective of names of the eNBs. For instance, a BS, an NB, an eNB, a pico-cell eNB (PeNB), a home eNB (HeNB), a relay, a repeater and the like can be a node. And, a node may not necessarily be an eNB. For instance, a radio remote head (RRH) or a radio remote unit (RRU) can be a node. In general, the RRH or the RRU has a power level lower than a power level of an eNB. Since the RRH or the RRU (hereinafter RRH/RRU) is generally connected with an eNB by such a dedicated line as an optical cable and the like, a coordinated communication between the RRH/RRU and an eNB can be more smoothly performed compared to a coordinated communication of eNBs connected with each other in wireless. At least one antenna is installed in a single node. The antenna may indicate a physical antenna, an antenna port, a virtual antenna, or an antenna group. A node is also called a point.

In the present invention, a cell indicates a prescribed geographical region to which one or more nodes provide a communication service. Hence, in the present invention, communicating with a specific cell may mean to communicate with an eNB or a node providing the communication service to the specific cell. And, a downlink/uplink signal of a specific cell may mean a downlink/uplink signal transmitted/received from/to the eNB or the node providing the communication service to the specific cell. In particular, a cell providing an uplink/downlink communication service to a UE is called a serving cell. And, channel state/quality of a specific cell means channel state/quality of a channel or a communication link formed between the eNB or the node providing the communication service to the specific cell and the UE. In a LTE/LTE-A based system, a UE can measure a downlink channel state from a specific node using a CRS(s) transmitted on a CRS (cell-specific reference signal) assigned to the specific node by an antenna port(s) of the specific node and/or a CSI-RS(s) (channel state information reference signal) transmitted on a CSI-RS (channel state information reference signal).

3GPP LTE/LTE-A standard defines downlink physical channels corresponding to resource elements carrying information originated from an upper layer and downlink physical signals corresponding to resource elements not carrying information originated from the upper layer. For instance, a physical downlink shared channel (PDSCH), physical broadcast channel (PBCH), a physical multicast channel (PMCH), a physical control format indicator channel (PCFICH), a physical downlink control channel (PDCCH) and a physical hybrid ARQ indicator channel (PHICH) are defined as the downlink physical channels. A reference signal and a synchronization signal are defined as the downlink physical signals. A reference signal, which is also called a pilot, indicates a signal of a predetermined special wave form known to both a BS and a UE. For instance, a cell-specific RS, a UE-specific RS, a positioning RS and a channel state information RS are defined as a downlink reference signal. 3GPP LTE/LTE-A standard defines uplink physical channels corresponding to resource elements carrying information originated from an upper layer and uplink physical signals corresponding to resource elements not carrying information originated from the upper layer although the information is used by a physical layer. For instance, a physical uplink shared channel (PUSCH), a physical uplink control channel (PUCCH) and a physical random access channel (PRACH) are defined as the uplink physical channel. A demodulation reference signal (DM RS) for an uplink control/data signal and a sounding reference signal (SRS) used for measuring an uplink channel are defined as the uplink physical signals.

In the present invention, PDCCH (Physical Downlink Control CHannel)/PCFICH (Physical Control Format Indicator CHannel)/PHICH ((Physical Hybrid automatic retransmit request Indicator CHannel)/PDSCH (Physical Downlink Shared CHannel) indicate a set of time-frequency resources or a set of resource elements carrying DCI (Downlink Control Information)/CFI (Control Format Indicator)/downlink ACK/NACK (ACKnowlegement/Negative ACK)/downlink data, respectively. And, PUCCH (Physical Uplink Control CHannel)/PUSCH (Physical Uplink Shared CHannel)/PRACH (Physical Random Access CHannel) indicate a set of time-frequency resources or a set of resource elements carrying UCI (Uplink Control Information)/uplink data/random access signal, respectively. In particular, in the present invention, a time-frequency resource or a resource element (RE) allocated (belonging) to PDCCH/PCFICH/PHICH/PDSCH/PUCCH/PUSCH/PRACH is called a PDCCH/PCFICH/PHICH/PDSCH/PUCCH/PUSCH/PRACH RE or a PDCCH/PCFICH/PHICH/PDSCH/PUCCH/PUSCH/PRACH resource. In the following description of the present invention, an expression that a UE transmits PUCCH/PUSCH/PRACH may be used as a same meaning that the UE transmits uplink control information/uplink data/random access signal on or via the PUCCH/PUSCH/PRACH. And, an expression that an eNB transmits PDCCH/PCFICH/PHICH/PDSCH may be used as a same meaning that the eNB transits downlink data/control information on the PDCCH/PCFICH/PHICH/PDSCH.

In the following, a structure of a downlink (hereinafter abbreviated DL) radio frame is explained with reference to FIG. 1.

In a cellular OFDM (orthogonal frequency division multiplexing) radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching an uplink transmission synchronization of a user equipment. The guard period is a period for eliminating interference generated in uplink due to multi-path delay of a downlink signal between uplink and downlink. Meanwhile, one subframe includes two slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
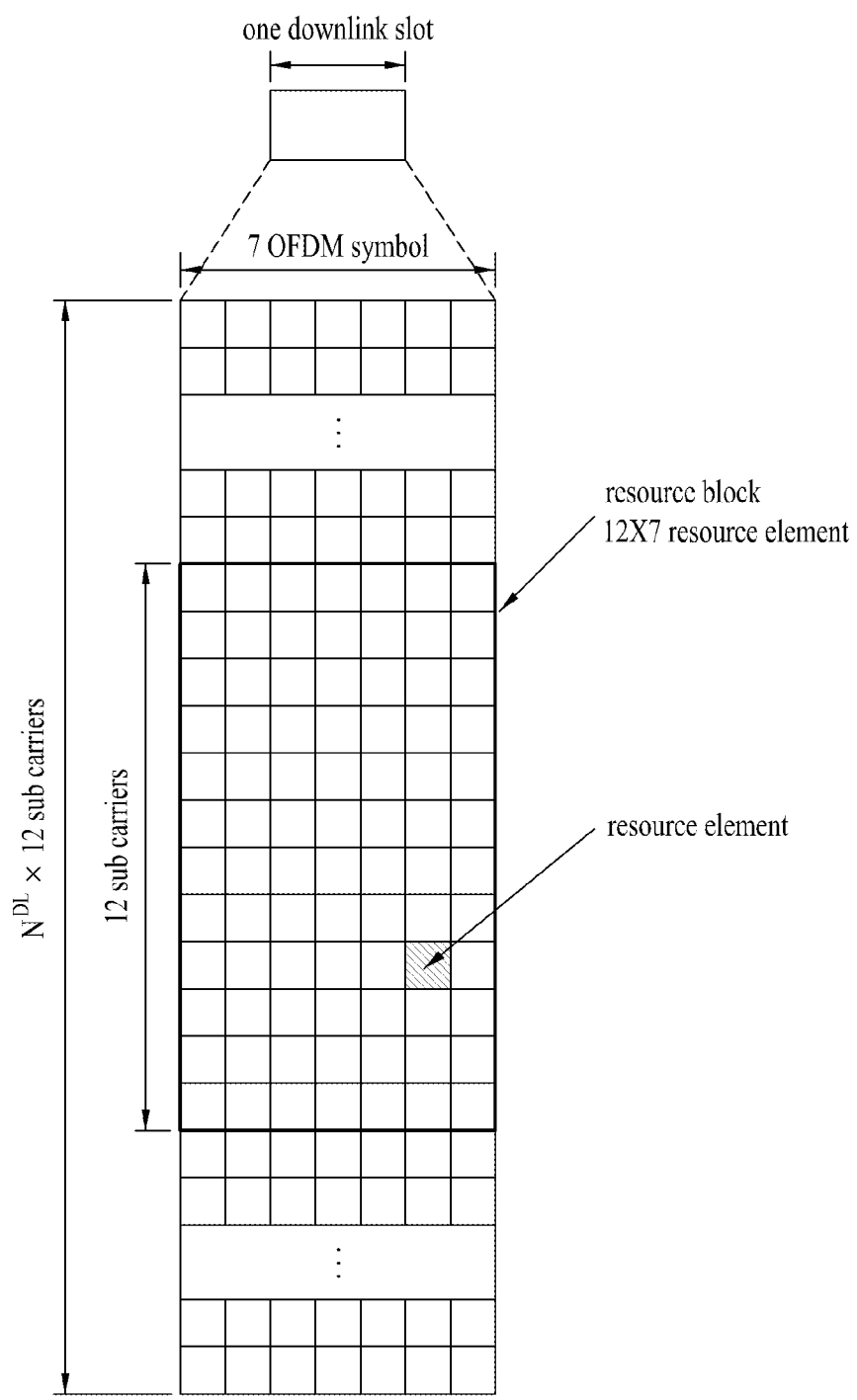
FIG. 2 is a diagram for one example of a resource grid for a downlink slot.

FIG. 2 is a diagram for one example of a resource grid for a downlink slot. FIG. 2 shows a case that an OFDM symbol is configured by a normal CP. Referring to FIG. 2, a downlink slot includes a plurality of OFDM symbols in time domain and includes a plurality of resource blocks in frequency domain. In this case, one downlink (DL) slot includes 7 OFDM symbols and one resource block (RB) includes 12 subcarriers in frequency domain, by which the present invention may be non-limited. Each element on a resource grid is called a resource element (RE). For instance, a resource element a (k, l) corresponds to a resource element positioned at a $k^{th}$ subcarrier and a first OFDM symbol. In case of a normal CP, one slot includes 7 OFDM symbols (in case of an extended CP, one slot may include 6 OFDM symbols). Since an interval between subcarriers corresponds to 15 kHz, one resource block includes about 180 kHz in frequency domain. $N^{DL}$ corresponds to the number of resource blocks included in a downlink slot. The number $N^{DL}$ of resource blocks included in a downlink slot may depend on a downlink transmission bandwidth configured by scheduling of a base station.

Figure 3:
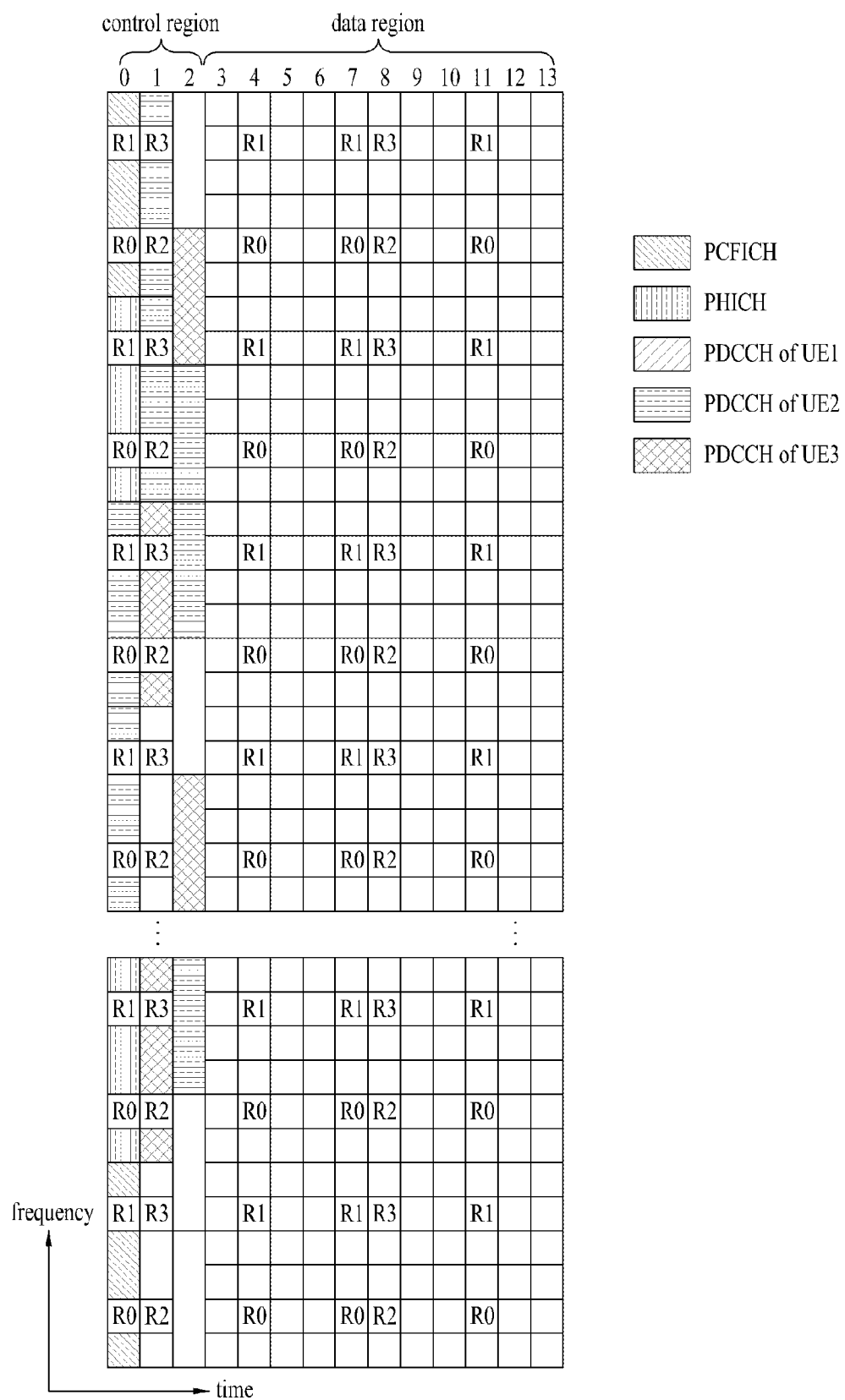
FIG. 3 is a diagram for an example of a control channel included in a control region of a subframe in a downlink radio frame.

FIG. 3 is a diagram for an example of a control channel included in a control region of a subframe in a downlink radio frame.

Referring to FIG. 3, one subframe includes 14 OFDM symbols. 1 to 3 OFDM symbols are used as a control region and remaining 13~11 OFDM symbols are used as a data region according to a subframe configuration. In FIG. 3, R1 to R4 indicates a reference signal (RS) or a pilot signal for an antenna 0 to an antenna 3. An RS is fixed by a prescribed pattern in a subframe irrespective of the control region and the data region. A control channel is assigned to a resource to which an RS is not allocated among the control region. A traffic channel is also assigned to a resource to which an RS is not allocated among the data region. Example of a control channel assigned to the control region include PCFICH (Physical Control Format Indicator Channel), PHICH (Physical hybrid automatic repeat request indicator Channel), PDCCH (Physical Downlink Control Channel) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of one or more CCEs.

Control information carried on PDCCH may be called downlink control information (hereinafter abbreviated DCI). The DCI includes resource allocation information for a UE or a UE group and different control information. For instance, The DCI may include a transmission format and resource allocation information of a DL shared channel (DL-SCH), a transmission format and resource allocation information of an UL shared channel (UL-SCH), paging information on a paging channel, system information on DL-SCH, resource allocation information of an upper layer control message such as a random access response transmitted on PDSCH, a set of transmit power control commands for individual user equipments in a user equipment (UE) group, a transmit power control command, activation indication information of VoIP (voice over IP), DAI (downlink assignment index) and the like. The transmission format and the resource allocation information of the DL shared channel (DL-SCH) are called DL scheduling information or a DL grant. The transmission format and the resource allocation information of the UL shared channel (UL-SCH) are called UL scheduling information or a UL grant. DCI carried on a PDCCH varies in size and purpose according to a DCI format. A size of the DCI may also vary according to a coding rate. Current 3GPP LTE system defines a format 0 and 4 for UL and defines a format 1, 1A, 1B, 1C, 1D, 2, 2A, 2B, 2C, 3, 3A and the like for DL. A combination selected from such control information as a hopping flag, RB allocation, MCS (modulation coding scheme), RV (redundancy version), NDI (new data indicator), TPC (transmit power control), cyclic shift DMRS (demodulation reference signal), UL index, CQI (channel quality information) request, DL assignment index, HARQ process number, TPMI (transmitted precoding matrix indicator) PMI (precoding matrix indicator) and the like is transmitted to a UE as DL control information in accordance with a purpose of each DCI format. Table 1 in the following indicates examples of the DCI format.

TABLE 1

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |

TABLE 1-continued

| DCI format | Description |
|---|---|
| 4 | Scheduling of PUSCH in one UL Component Carrier with multi-antenna port transmission mode |

In general, a DCI format capable of being transmitted to a UE varies according to a transmission mode (TM) set to the UE. In other word, for a UE configured by a specific transmission mode, a prescribed DCI format(s) corresponding to the specific transmission mode can be used only instead of a use of all DCI formats.

PDCCH is transmitted on aggregation of at least one or more contiguous CCEs (control channel elements). CCE is a logical assignment unit used to provide PDCCH with a coding rate in accordance with a state of a radio channel. CCE corresponds to a plurality of REGs (resource element groups). For instance, one CCE corresponds to 9 REGs and one REG corresponds to 4 REs. In case of a 3GPP LTE system, a CCE set at which PDCCH is capable of positioning is defined for each UE. A CCE set where a UE is capable of searching for PDCCH of the UE is called a PDCCH search space, simply a search space (SS). An individual resource capable of transmitting PDCCH in the search space is called a PDCCH candidate. A set of PDCCH candidates to be monitored by the UE is defined as a search space. In 3GPP LTE/LTE-A system, a search space for each DCI format may have a size different from each other. The search space can be classified into a dedicated search space and a common search space. The dedicated search space corresponds to a UE-specific search space. The dedicated search space is configured for each individual UE. The common search space is configured for a plurality of UEs. Table 2 in the following shows examples of aggregation levels defining search spaces.

TABLE 2

| | Search Space | | |
|---|---|---|---|
| Type | Aggregation level L | Size [in CCEs] | Number of PDCCH candidates M(L) |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to a CCE aggregation level. An eNB transmits an actual PDCCH (DCI) on a random PDCCH candidate in a search space and a UE monitors the search space to search for the PDCCH (DCI). In this case, monitoring means to attempt to decode each PDCCH in the search space according to all monitored DCI formats. The UE monitors a plurality of PDCCHs and may be then able to detect PDCCH of the UE. Basically, since the UE is not aware of a position to which the PDCCH of the UE is transmitted, the UE attempts to decode all PDCCHs of a corresponding DCI format in every subframe until PDCCH including an identifier of the UE is detected. This process is called a blind detection (or blind decoding (BD)).

Meanwhile, in order to reduce overhead of the blind decoding, the number of DCI formats is defined to be smaller than the number of types of control information transmitted using PDCCH. A DCI format includes a plurality of information fields different from each other. A type of an information field, the number of information field, bit number of each information field and the like vary according to a DCI format. And, a size of control information matched with a DCI format varies according to the DCI format. A random DCI format can be used for transmitting control information of two or more types.

Table 3 in the following shows an example of control information transmitted by a DCI format 0. In the following Table 3, a bit size of each information field is just an example only. A bit size of a field may be non-limited by the Table 3.

TABLE 3

| Information Field | bit(s) |
|---|---|
| (1) Flag for format 0/format 1A differentiation | 1 |
| (2) Hopping flag | 1 |
| (3) Resource block assignment and hopping resource allocation | $\text{ceil}\{\log_2(N^{UL}_{RB}(N^{UL}_{RB}+1)/2)\}$ |
| (4) Modulation and coding scheme and redundancy version | 5 |
| (5) New data indicator | 1 |
| (6) TPC command for scheduled PUSCH | 2 |
| (7) Cyclic shift for DMRS | 3 |
| (8) UL index (TDD) | 2 |
| (9) CQI request | 1 |

A flag field corresponds to an information field used for distinguishing a format 0 from a format 1A. In particular, the DCI format 0 and the DCI format 1A have an identical payload size and distinguished from each other by the flag field. A resource block allocation field and a hopping resource allocation field may have a different bit size according to hopping PUSCH or non-hopping PUSCH. A resource block allocation field and a hopping resource allocation field for the non-hopping PUSCH provide cell $\{\log_2(N^{UL}_{RB}(N^{UL}_{RB}+1)/2)\}$ bit for resource allocation allocated to a first slot of a UL subframe. In this case, $N^{UL}_{RB}$ corresponds to the number of resource blocks included in a UL slot and is determined according to a UL bandwidth configured in a cell. Hence, a payload size of the DCI format 0 may vary according to the UL bandwidth. The DCI format 1A includes an information field for PDSCH assignment. A payload size of the DCI format 1A may also vary according to a DL bandwidth. The DCI format 1A provides the DCI format 0 with a reference information bit size. Hence, if the number of information bits of the DCI format 0 is less than the number of information bits of the DCI format 1A, '0' is added to the DCI format 0 until the payload size of the DCI format 0 becomes identical to the payload size of the DCI format 1A. A padding field of the DCI format is filled with the added '0'.

Meanwhile, in order to maintain a calculation load according to an attempt of blind decoding to be less than a prescribed level, all DCI formats are not searched at the same time. For instance, a UE is semi-statically configured by upper layer signaling to receive PDSCH data transmission signaled via PDCCH according to one of a transmission mode 1 to 9. Table 4 in the following shows examples of DCI formats used for performing blind decoding by a UE in a transmission mode configured to implement a multi-antenna technology and a corresponding transmission mode.

TABLE 4

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single antenna port, port 0 is used, otherwise Transmit diversity |
|  | DCI format 2B | UE specific by C-RNTI | Dual laayer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise If the number of PBCH antenna ports is one, Single antenna port, port 0 is used, otherwise Transmit diversity MBSFN subframe: Single-antenna port, port 7 |
|  | DCI format 2C | UE specific by C-RNTI | Up to 8 layer transmission, ports 7-14 |

In particular, Table 4 shows a relationship between PDCCH configured by C-RNTI (cell RNTI (radio network temporary identifier)) and PDSCH. A UE, which is configured to decode PDCCH using a CRC scrambled to the C-RNTI by an upper layer, decodes the PDCCH and corresponding PDSCH according to each combination defined in Table 4. For instance, if a UE is configured by a transmission mode 1 by upper layer signaling, the UE decodes PDCCH using a DCI format 1A and a DCI format 1 and obtains one of a DCI of the DCI format 1A and a DCI of the DCI format 1.

Transmission/reception of PDCCH is explained in more detail in the following description. An eNB generates control information according to a DCI format. The eNB can select a DCI format among a plurality of DCI formats (DCI format 1, 2, . . . , N) according to control information to be transmitted to a UE. A CRC (cyclic redundancy check) is attached to the control information, which is generated according to each DCI format, to detect an error. An identifier (e.g., RNTI (radio network temporary identifier)) is masked on the CRC according to an owner of PDCCH or a usage of PDCCH. In other word, the PDCCH is CRC-scrambled by the identifier (e.g., RNTI). When a C-RNTI is used, the PDCCH carries control information for a corresponding specific UE. When a different RNTI (e.g., P-RNTI (paging RNTI), SI-RNTI (system information RNTI), RA-RNTI (random access RNTI) is used, the PDCCH carries common control information which is received by all UEs in a cell. The eNB generates a coded data in a manner of performing channel coding on the control information to which the CRC is attached. The eNB performs a rate matching according to a CCE aggregation level assigned to the DCI format and generates modulation symbols in a manner of modulating the coded data. A CCE aggregation level of the modulation symbols constructing a PDCCH may correspond to one of 1, 2, 4 and 8. The modulation symbols are mapped to a physical resource element (RE) (CCE to RE mapping). In order to detect PDCCH, a UE performs CCE to RE de-mapping. Since the UE does not know a CCE aggregation used for receiving PDCCH, the UE performs demodulation for each CCE aggregation level. The UE performs rate de-matching for a demodulated data. Since the UE does not know which control information of a DCI format (or DCI payload size) should be received, the UE performs rate de-matching for each DCI format (or DCI payload size) for a transmission mode set to the UE. The UE performs channel decoding on the rate de-matched data according to a code rate, checks a CRC and detects whether an error occurs. If an error does not occur, the UE may determine is as the UE has detected PDCCH of the UE. If an error occurs, the UE continuously performs blind decoding on a different CCE aggregation level or a different DCI format (or DCI payload size). Having detected the PDCCH of the UE, the UE eliminates a CRC from the decoded data and obtains control information.

The eNB can transmit data for a UE or a UE group via a data region. The data transmitted via the data region is called a user data. In order to transmit the user data, PDSCH (physical downlink shared channel) can be assigned to the data region. PCH (paging channel) and DL-SCH (downlink-shared channel) are transmitted on the PDSCH. The UE is able to read data transmitted via the PDSCH in a manner of decoding control information transmitted via PDCCH. Information on where the data of the PDSCH is transmitted to which UE or a UE group, information on how to receive and decode the PDSCH data by the UE or the UE group and the like are transmitted in a manner of being included in the PDCCH. For instance, assume that a specific PDCCH is CRC masked with an RNTI (radio network temporary identity) called "A" and information on data transmitted using a radio resource (e.g., frequency position) called "B" and transmission form information (e.g., a transport block size, a modulation scheme, coding information, and the like) called "C" is transmitted via a specific subframe. In this case, a UE monitors the PDCCH using the RNTI information of its own, if there exist a UE having the "A" RNTI, the UE detects the PDCCH and receives PDSCH, which is indicated by the "B" and the "C", via the received information on the PDCCH.

An introduction of an RRH (remote radio head) is recently discussing to improve system performance. In a carrier aggregation situation, a plurality of carriers can be configured for a UE. Each of a plurality of the carriers to which carrier aggregation is applied is called a component carrier (CC). A CC configured for a UE is called a serving CC. In case that a plurality of CCs are configured for a UE, a method of transmitting a UL/DL grant transmitted by a serving CC in a good channel state is discussing. As mentioned in the foregoing description, if a CC carrying a UL/DL grant, which is scheduling information, and a CC performing UL/DL transmission corresponding to the UL/DL grant are different from each other, it is called a cross-carrier scheduling. If an RRH technology, a cross-carrier scheduling technology and the like are introduced, an amount of PDCCH to be transmitted by an eNB is gradually increasing. Yet, since a size of a control region to which PDCCH is transmitted is fixed, PDCCH transmission works as a bottleneck of system performance. Hence, in order to prevent the PDCCH transmission from restricting system performance, discussion on a method of performing the PDCCH transmission using a PDSCH region is in progress. Referring to FIG. 3, PDCCH according to a legacy 3GPP LTE (-A) standard can be assigned to a PDCCH region of a DL subframe and an additional or a separate PDCCH can be assigned using a partial resource of a PDSCH region. The legacy PDCCH is transmitted using resources situating over a wide frequency band in frequency domain. On the contrary, the PDCCH transmitted in the PDSCH region is generally transmitted using a narrow frequency band only. In the following description, in order to distinguish the legacy PDCCH transmitted in a head part OFDM symbol(s) of a DL subframe from the PDCCH transmitted in latter OFDM symbols (PDSCH region) in the DL subframe, the PDCCH transmitted in latter OFDM symbols (PDSCH region) in the DL subframe is called an embedded PDCCH (e-PDCCH). The e-PDCCH is also called an E-PDCCH (enhanced PDCCH) or an A-PDCCH (advanced PDCCH). PDSCH/PUSCH scheduled by the e-PDCCH is called an e-PDSCH/e-PUSCH.

Figure 4:
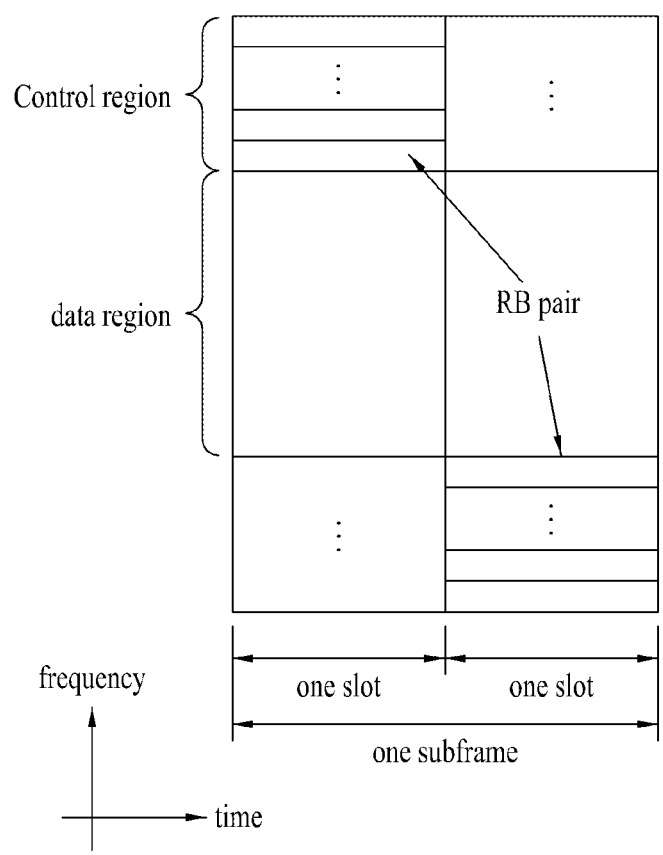
FIG. 4 is a diagram for a structure of an uplink subframe. An uplink subframe can be divided into a control region and a data region in frequency domain.

FIG. 4 is a diagram for a structure of an uplink subframe. An uplink subframe can be divided into a control region and a data region in frequency domain. A PUCCH (physical uplink control channel) including uplink control information is assigned to the control region. A PUSCH (physical uplink shared channel) including a user data is assigned to the data region. In order to maintain a single carrier property, a single UE does not transmit the PUCCH and the PUSCH at the same time. The PUCCH for the single UE is assigned to a resource block pair (RB pair) in a subframe. Resource blocks belonging to a resource block pair occupy subcarriers different from each other for two slots. This is called as a resource block pair allocated to PUCCH is frequency-hopped on a slot boundary.

Configuration of Downlink Control Channel

Basically, first 3 OFDM symbols of each subframe can be used as a region to which a downlink control channel is transmitted. 1 to 3 OFDM symbols can be used according to overhead of the downlink control channel. In order to adjust the number of OFDM symbols for the downlink control channel in every subframe, it may use PCFICH. In order to provide a confirmation response (positive confirmation response (ACK)/negative confirmation response (NACK) in response to uplink transmission, it may use PHICH. In order to transmit control information for downlink data transmission and uplink data transmission, it may use PDCCH.

Figure 5:
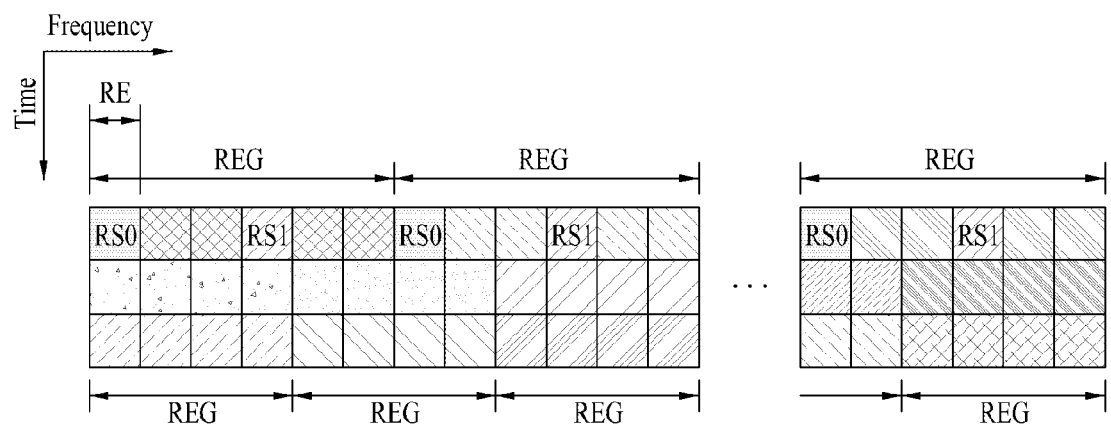
FIGS. 5 and 6 are diagrams for downlink control channels respectively assigned to a control region of each subframe in a REG (resource element group) unit.
Figure 6:
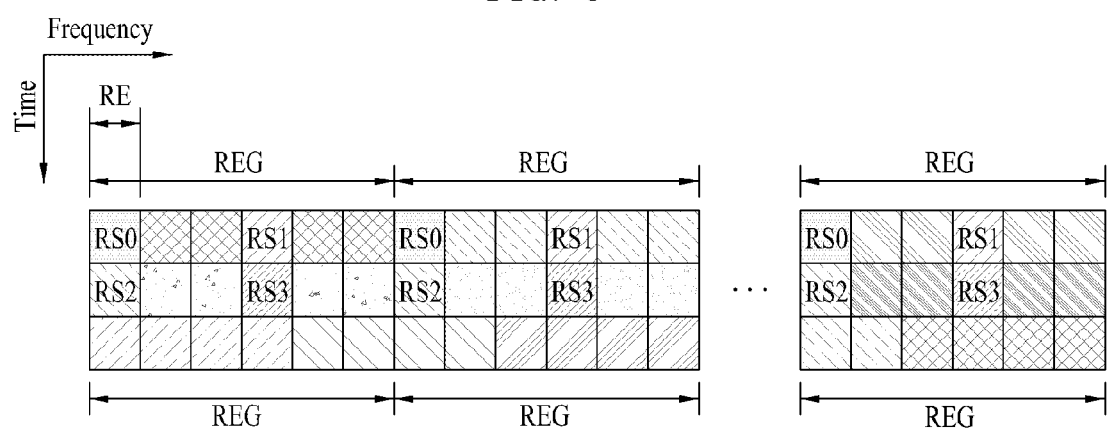

FIGS. 5 and 6 are diagrams for downlink control channels respectively assigned to a control region of each subframe in a REG (resource element group) unit. FIG. 5 shows a system including a configuration of one or two transmission antennas and FIG. 6 shows a system including a configuration of 4 transmission antennas. As shown in FIGS. 5 and 6, an REG, which is a basic resource unit to which a control channel is assigned, consists of 4 REs adjacent to each other in frequency domain except a resource element to which a reference signal is assigned. REGs of specific number can be used to transmit a downlink control channel according to overhead of the downlink control channel.

PCFICH (Physical Control Format Indicator Channel)

PDCCH can be transmitted between an OFDM symbol index 0 and 2 to provide resource allocation information of a subframe and the like in each subframe. OFDM symbol index 0, OFDM symbol index 0 and 1 or OFDM symbol index 0 to 2 can be used depending on overhead of a control channel. The number of OFDM symbols used by the control channel can be changed according to a subframe. Information on the number of the OFDM symbols can be provided by PCFICH. Hence, the PCFICH should be transmitted in each subframe.

3 kinds of information can be provided by the PCFICH. Table 1 indicates a CFI (control format indicator) of the PCFICH. A CFI value set to 1 indicates that PDCCH is transmitted on OFDM symbol index 0, a CFI value set to 2 indicates that PDCCH is transmitted on OFDM symbol index 0 and 1, and a CFI value set to 3 indicates that PDCCH is transmitted on OFDM symbol index 0 to 2.

TABLE 5

| CFI | CFI codeword <b0, b1, . . . , b31> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted on PCFICH can be differently defined according to a system bandwidth. For instance, if a system bandwidth is less than a specific threshold, the CFI value set to 1, 2, and 3 may indicate that 2, 3, and 4 OFDM symbols are used for PDCCH, respectively.

Figure 7:
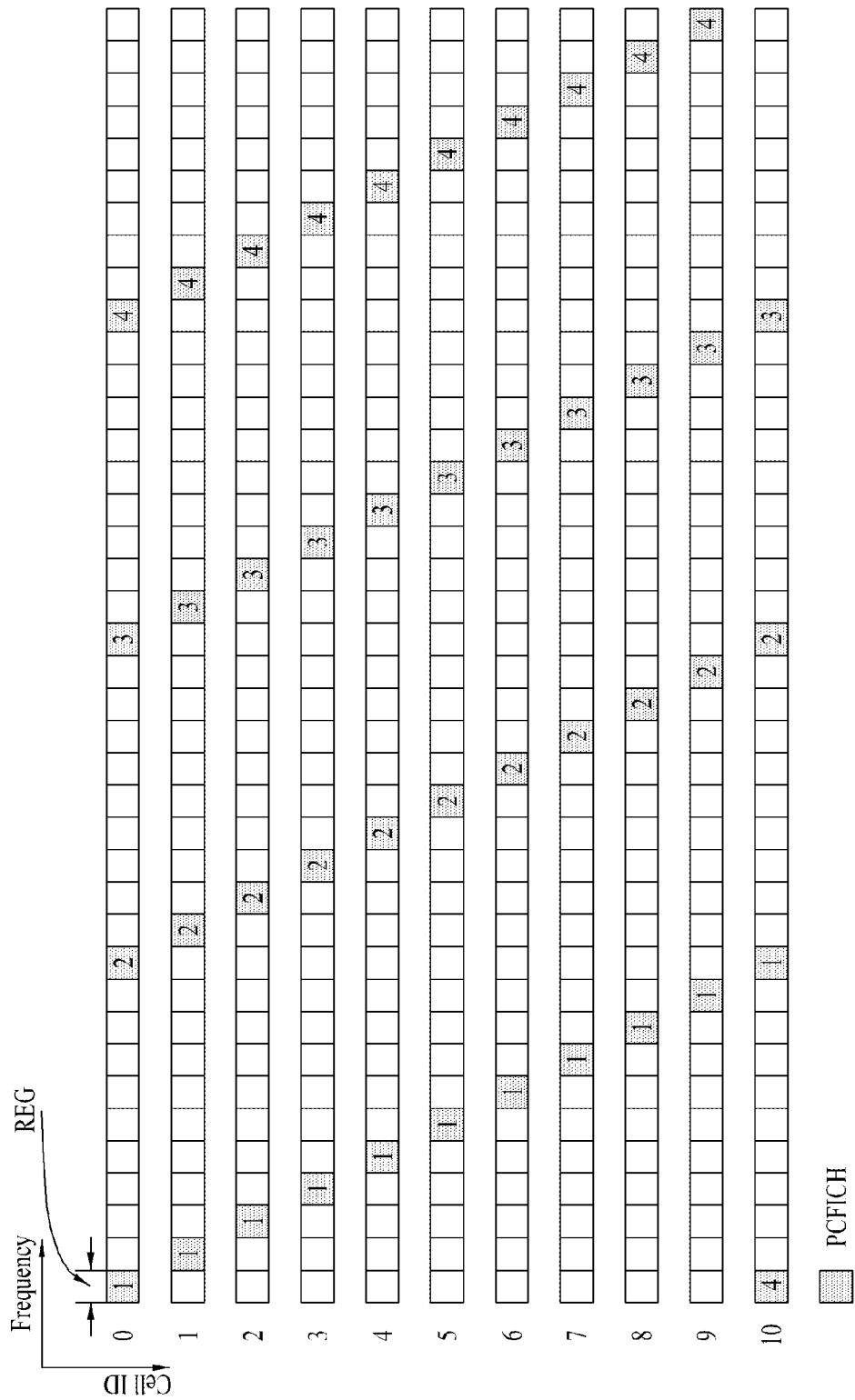
FIG. 7 is a diagram for a scheme of transmitting PCFICH.

FIG. 7 is a diagram for a type of transmitting a physical control format indicator channel (PCFICH). Referring to FIG. 7, REG includes 4 subcarriers, and more particularly, data subcarriers except a reference signal. In general, a transmit diversity scheme can be applied to the REG. In order to prevent inter-cell interference, the REG may be shifted in frequency domain in every cell, i.e., in accordance with a cell ID. In addition, since the PCFICH is transmitted on a first OFDM symbol (OFDM symbol index 0) of a subframe all the time, if a receiver receives the subframe, the receiver preferentially checks information of the PCFICH, identifies the number of OFDM symbols to which PDCCH is transmitted, and then receives control information transmitted on the PDCCH.

PHICH (Physical Hybrid-ARQ Indicator Channel)

Figure 8:
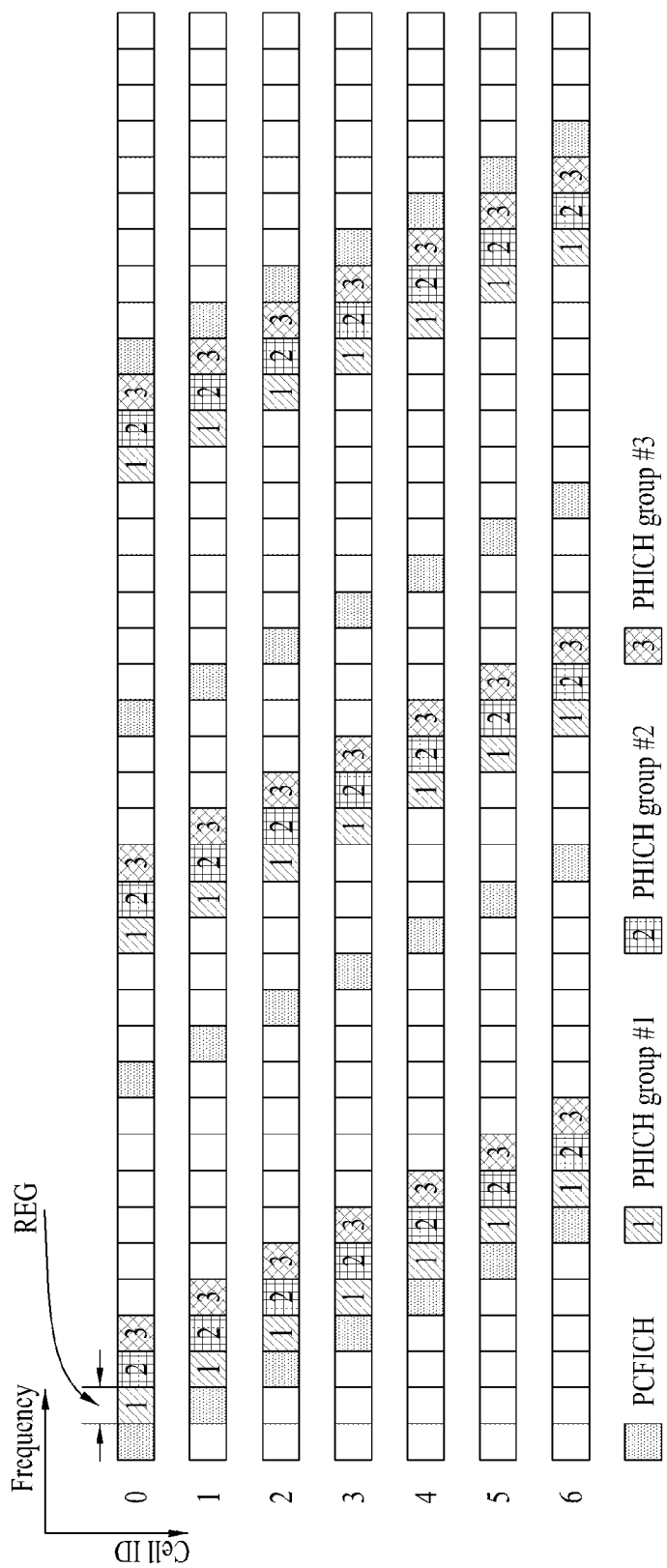
FIG. 8 is a diagram for positions of PCFICH and PHICH normally applied on a specific bandwidth.

FIG. 8 is a diagram for a position of a PCFICH and a position of a physical HARQ indicator channel (PHICH) generally applied in a specific bandwidth. First of all, PHICH is a channel that carries ACK/NACK information on a UL data transmission. Pluralities of PHICH groups are formed in one subframe and pluralities of PHICHs exist in one PHICH group. Hence, one PHICH group may include PHICHs for a plurality of user equipments.

As depicted in FIG. 8, PHICH assignment for each user equipment in several PHICH groups is performed using a lowest PRB (physical resource block) index of a PUSCH resource allocation and a cyclic shift index for a demodulation reference signal (DMRS) transmitted on an uplink grant PDCCH. The DMRS is a UL reference signal provided together with UL transmission to perform channel estimation for a UL data demodulation. The PHICH resource is known as such an index pair as $(n_{PHICH}^{group}, n_{PHICH}^{seq})$. In this case, $n_{PHICH}^{group}$ and $n_{PHICH}^{seq}$ in the index pair $(n_{PHICH}^{group}, n_{PHICH}^{seq})$ indicate a PHICH group number and an orthogonal sequence index in the corresponding PHICH group, respectively. The above-mentioned $n_{PHICH}^{group}$ and $n_{PHICH}^{seq}$ may be defined by Formula 1 in the following.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Formula 1]}$$

In Formula 1, $n_{DMRS}$ indicates a cyclic shift of DMRS used for a UL transmission related to PHICH and is mapped to a value of a 'cyclic shift for DMRS' field of a latest UL grant control information (e.g., DCI format 0 or 4) on a transport block (TB) related to corresponding PUSCH transmission. For instance, the 'cyclic shift for DMRS' field of the latest UL grant DCI format may have a size of 3-bit. If this field has a value of '000', $n_{DMRS}$ can be configured to have a value of '0'.

In Formula 1, $N_{SF}^{PHICH}$ indicates a size of a spreading factor used for PHICH modulation. $I_{PRB\_RA}^{lowest\_index}$ indicates a lowest PRB index in a first slot used for corresponding PUSCH transmission. $I_{PHICH}$ has a value of '1' on a special case (UL/DL configuration is set to '0' and PUSCH is transmitted in $4^{th}$ or $9^{th}$ subframe) in a TDD system. Otherwise, $I_{PHICH}$ has a value of '0'. $N_{PHICH}^{group}$ indicates the number of PHICH group(s) configured by an upper layer and can be defined by Formula 2 in the following.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g$ indicates information on a size of PHICH resource transmitted on PBCH (Physical Broadcast Channel). $N_g$ has a size of 2-bit and is represented as ($N_g \in \{1/6, 1/2, 1, 2\}$). In Formula 2, $N_{RB}^{DL}$ indicates the number of resource block(s) configured in DL.

Table 6 in the following shows examples of an orthogonal sequence defined by a legacy 3GPP LTE release 8/9.

TABLE 6

| | Orthogonal sequence | |
|---|---|---|
| Sequence index $n_{PHICH}^{seq}$ | Normal cyclic prefix $N_{SF}^{PHICH}=4$ | Extended cyclic prefix $N_{SF}^{PHICH}=2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
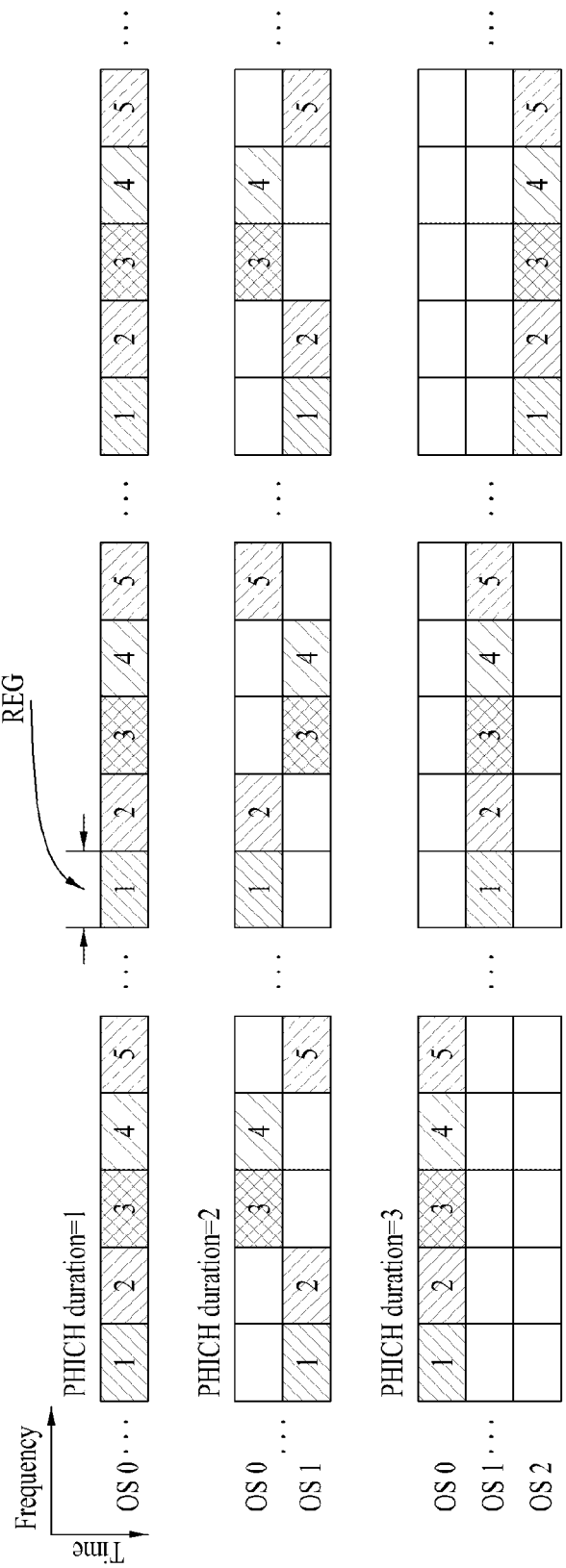
FIG. 9 is a diagram for a position of a downlink resource element to which PHICH group is mapped.

FIG. 9 is a diagram for a position of a downlink resource element to which a PHICH group is mapped. As depicted in FIG. 9, the PHICH group can be configured in a different time domain (i.e., different OS (OFDM symbol)) within one subframe according to PHICH duration.

Uplink Retransmission

Uplink retransmission can be indicated by the aforementioned PHICH and the DCI format 0 (DCI format that schedules PUSCH transmission). A UE can perform synchronous non-adaptive retransmission by receiving ACK/NACK for a previous UL transmission via the PHICH. Or, the UE can perform synchronous adaptive retransmission by receiving a UL grant from an eNB via the DCI format 0 PDCCH.

In this case, the synchronous transmission means a scheme that a retransmission is performed on a predetermined timing point (e.g., n+k subframe) after a timing point (e.g., $n^{th}$ subframe) on which one data packet is transmitted (e.g., k equals to 4). The synchronous retransmission is performed for both the retransmission indicated by the PHICH and the retransmission indicated by the UL grant PDCCH.

The non-adaptive retransmission indicated by the PHICH is a scheme that uses a frequency resource and a transmission method identical to a frequency resource (e.g., physical resource block (PRB)) region and a transmission method (e.g., modulation scheme and the like) used for a previous transmission. Meanwhile, the adaptive retransmission indicated by the UL grant PDCCH is a scheme that a frequency resource in which a retransmission is performed according to scheduling control information indicated by a UL grant and a transmission method may be differently configured from a previous transmission.

If a UE receives PHICH and UL grant PDCCH at the same time, the UE can perform a UL transmission according to control information of the UL grant PDCCH while ignoring the PHICH. A new data indicator (NDI) is included in the UL grant PDCCH (e.g., DCI format 0 or 4). If an NDI bit is toggled compared to a previously provided NDI value, the UE regards it as a previous transmission is successful and may be then able to transmit a new data. Meanwhile, although the UE receives ACK for a previous transmission on the PHICH, if an NDI value is not toggled in the UL grant PDCCH, which is simultaneously or afterward received with the PHICH, the UE is configured not to flush a buffer for the previous transmission.

MIMO System

The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 10:
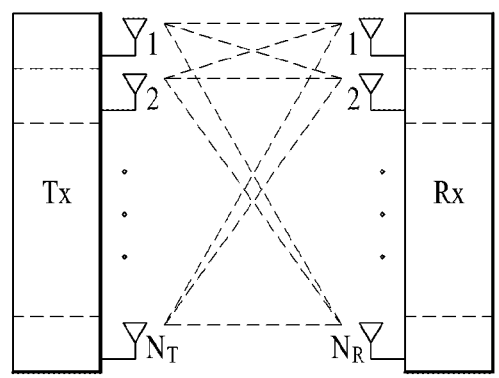
FIG. 10 is a diagram for a configuration of a general multi antenna (MIMO) communication system.

A block diagram of a general multi-antenna communication system is depicted in FIG. 10. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$ as shown in the following Formula 1. In this case, the $R_i$ is a smaller value of the $N_T$ and the $N_R$.

$$R_T = \min(N_T, N_R) \quad \text{[Formula 3]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 10, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 4.

$$s = [s_1, s_2, \ldots, s_{N_T}]^T \quad \text{[Formula 4]}$$

Meanwhile, for each of the transmission informations $s_1$, $s_2, \ldots, s_{N_T}$, a transmit power may be differentiated according to the each of the transmission informations. In this case, if each of the transmit powers is represented as $P_1$, $P_2, \ldots, P_{N_T}$, transmit power-adjusted transmission information can be represented as a vector in the following Formula 5.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 5]}$$

And, if ŝ represented using a diagonal matrix P, it can be represented as a following Formula 6.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector Ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 7. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$  [Formula 7]

$$W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 8.

$$\text{rank}(H) \leq \min(N_T, N_R)$$  [Formula 8]

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 9 in the following.

$$\text{\# of streams} \leq \text{rank}(H) \leq \min(N_T, N_R)$$  [Formula 9]

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following description, a reference signal is explained.

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both a transmitting end and the receiving end is transmitted and the channel information is found out with the extent of distortion when the signal is received on a channel. The signal known to both the receiving end and the transmitting end is called a pilot signal or a reference signal.

Recently, when a packet is transmitted, most of mobile communication systems intend to enhance transmission and reception efficiency by selecting multiple transmitting antennas and multiple receiving antennas instead of using a single transmitting antenna and a single receiving antenna. In case that a transmitting end or a receiving end intends to increase capacity or improve performance using multiple antennas, the transmitting end or the receiving end can receive a correct signal when a channel status between a transmitting antenna and a receiving antenna is known only. Hence, a separate reference signal should exist according to each transmitting antenna.

In a wireless communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like.

In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

LTE system defines two types of downlink RS for a unicast service. Specifically, one is a common RS (CRS) used for obtaining information on a channel status and performing measurement related to handover and the like and another is a dedicated RS (DRS) used for data demodulation. In this case, the CRS is also called a cell-specific RS and the DRS is also called a UE-specific RS.

In LTE system, the DRS is only used for the use of data demodulation and the CRS can be used for two purposes, i.e., obtaining channel information and performing data demodulation. The CRS is transmitted in every subframe over a wide band as a cell-specific reference signal. And, the CRS is transmitted based on maximum 4 antenna ports depending on the number of transmitting antenna of a base station. For instance, if the number of transmitting antenna of the base station corresponds to 2, the CRS for an antenna port 0 and the CRS for an antenna port 1 are transmitted. If the number of transmitting antenna of the base station corresponds to 4, the CRSs for an antenna port 0 to 3 are transmitted, respectively.

CoMP (Cooperative Multipoint Transmission/Reception) Method

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by two or more base stations, access points or cells to cooperatively communicate with a user equipment to smoothly perform communication between the specific user equipment and the base stations, the access points or the cells. Throughout the present invention, a base station, an access point or a cell can be used as an identical meaning.

Figure 11:
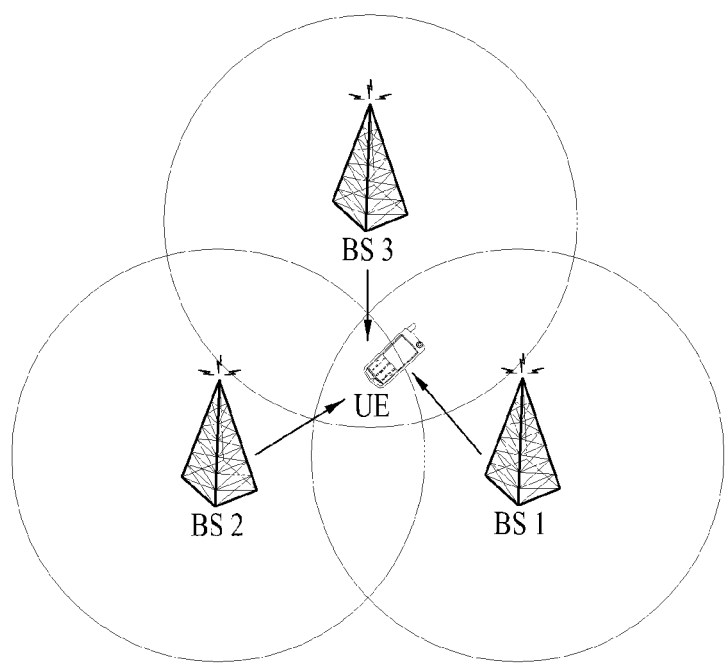
FIG. 11 is a diagram for an example of performing CoMP.

FIG. 11 is a diagram for an example of performing CoMP. Referring to FIG. 11, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other. The CoMP can be mainly classified into two types according to whether data is transmitted from each of a plurality of the base stations performing the CoMP.

—Joint Processing (CoMP Joint Processing (CoMP-JP))
—Cooperative scheduling/beamforming (CoMP-CS/CB)

According to the CoMP-JT, data are simultaneously transmitted to a user equipment from each of a plurality of the base stations performing the CoMP and the user equipment increases reception capability by combining signals transmitted from each of a plurality of the base stations with each other. On the contrary, in case of the CoMP-CS, data is transmitted to single user equipment on a random moment via a base station and scheduling or beamforming is performed to minimize interference from a different base station.

Channel State Information (CSI) Report

A channel state information report is explained in the following. Current 3GPP LTE system defines two kinds of transmission schemes including an open-loop MIMO which is managed without channel state information and a closed-loop MIMO which is managed based on channel state information. In order to obtain multiplexing gain of MIMO antennas in the closed-loop MIMO, a base station and a UE respectively perform beamforming based on the channel state information. In order for the base station to obtain the channel state information from the UE, the base station assigns PUCCH (physical uplink control channel) or PUSCH (physical uplink shared channel) to the UE and commands the UE to feedback channel state information (CSI) on a downlink signal.

The CSI is mainly classified into 3 kinds of information including RI (rank indicator), PMI (precoding matrix index) and CQI (channel quality indication). First of all, the RI indicates rank information of a channel and means the number of signal stream capable of being received via an identical frequency-time resource by a user equipment. Since a value of the RI is determined by a long term fading of a channel, the value of the RI is fed back to a base station with an interval longer than a PMI and CQI value in general.

Secondly, the PMI is a value to which a spatial characteristic of a channel is reflected. The PMI indicates a precoding matrix index of a base station preferred by a user equipment on the basis of such a metric as a SINR and the like. Lastly, the CQI is a value indicating strength of a channel and means a reception SINR capable of being obtained when a base station uses the PMI in general.

In a more enhanced communication system such as LTE-A system, additional multi-user diversity gain using MU-MIMO (multi-user MIMO) is added. Since there exists interference between user equipments multiplexed in an antenna domain in MU-MIMO, whether CSI is accurate may influence not only a user equipment reporting the CSI but also a different multiplexed user equipment as interference. Hence, MU-MIMO requires a more accurate CSI report compared to SU-MIMO.

Hence, LTE-A system has determined to design a final PMI which is divided into two kinds including a W1 corresponding to a long term and/or wideband (WB) PMI and a W2 corresponding to a short term and/or a sub-band (SB) PMI.

As an example of a hierarchical codebook transformation scheme for constructing a single final PMI from two channel information, i.e., the W1 and W2, a codebook can be transformed using a long-term covariance matrix shown in Formula 10 in the following.

$$W = \text{norm}(W1\,W2) \quad \text{[Formula 10]}$$

Referring to Formula 10, the W2 (short term PMI) corresponds to a code word of a codebook which is made to reflect short-term channel state information, the W is a code word (in other word, a precoding matrix) of a final codebook and norm(A) means a matrix that a norm of each column of a matrix A is normalized by 1.

A concrete structure of a legacy W1 and W2 is shown in Formula 11 in the following.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Formula 11]}$$

$$W2(j) = \begin{bmatrix} \overbrace{e_M^k \quad e_M^l \quad e_M^m}^{r \text{ columns}} \\ \cdots \\ \alpha_j e_M^k \quad \beta_j e_M^l \quad \gamma_j e_M^m \end{bmatrix} \text{ (if rank = r)},$$

where $1 \le k, l, m \le M$ and $k, l, m$ are integer.

In this case, $N_t$ corresponds to the number of transmitting antenna and M corresponds to the number of columns of a matrix $X_i$. Hence, it indicates that there is a total M number of candidate column vectors. $e_M^k$, $e_M^l$ and $e_M^m$ indicate that a $k^{th}$, a $l^{th}$ and a $m^{th}$ column vector of the matrix $X_i$ respectively, as a column vector where a $k^{th}$, a $l^{th}$ and a $m^{th}$ element correspond to 1 and remaining elements correspond to 0 among total M number of elements. $\alpha_j$, $\beta_j$ and $\gamma_j$ are complex values each of which has a unit norm. $\alpha_j$, $\beta_j$ and $\gamma_j$ indicate that a phase rotation is applied when each of the $k^{th}$, the $l^{th}$ and the $m^{th}$ column vector of the matrix $X_i$ is selected. The i is an integer greater than 0 and corresponds to a PMI index indicating the W1. The j is an integer greater than 0 and corresponds to a PMI index indicating the W2.

In Formula 11, a structure of a code word uses a cross polarized antenna. The code word structure corresponds to a structure to which a correlation characteristic of a channel, which occurs when a space between antennas is dense (if a distance between neighboring antennas is less than half of a signal wavelength in general), is reflected. In case of the cross polarized antenna, the antenna can be classified into a horizontal antenna group and a vertical antenna group. Each of the antenna groups has a ULA (uniform linear array) antenna characteristic and two antenna group can co-locate.

Hence, a correlation between antennas of two groups has an identical linear phase increment characteristic and a correlation between the antenna groups has a characteristic of phase rotation. Since a codebook corresponds to a quantized value of a channel, it is necessary to design a codebook in a manner of reflecting a characteristic of a channel in the codebook as it is. For clarity, an example of a rank 1 code word, which is made based on the aforementioned structure, is shown in Formula 12 in the following.

$$W1(i) * W2(j) = \begin{bmatrix} X_i(k) \\ \alpha_j X_i(k) \end{bmatrix} \quad \text{[Formula 12]}$$

In Formula 12, a code word is represented by a vector consisting of $N_t$ (the number of transmitting (Tx) antenna)× 1. The code word is structured by an upper vector $X_i(k)$ and a low vector $\alpha_j X_i(k)$ and each shows a correlation characteristic between the horizontal antenna group and the vertical antenna group. It may preferable that the $X_i(k)$ is represented by a vector including linear phase increment characteristic in a manner of reflecting the correlation characteristic between antennas of each antenna group. As a representative example, it may use a DFT (discrete Fourier transform) matrix.

Measurement of DL and Reporting of the Measured DL

In order for an eNode B to support a handover operation of a user equipment, inter-cell interference coordination and the like, it is necessary for the user equipment to perform DL measurement and report the measured DL to the eNode B. The DL measurement includes such various measurement schemes as measurement for RLM (radio link monitoring), measurement for a CSI (channel state information) report, measurement for RRM (radio resource management) and the like and various measurement values.

For instance, the RLM measurement may include DL measurement used in the process of detecting RLF (radio link failure) and searching for a new radio link. For instance, the measurement for a CSI report may include measurement used for reporting an appropriate rank indicator, a precoding matrix indicator and a channel quality indicator in a manner of selecting/calculating the rank indicator, the precoding matrix indicator and the channel quality indicator. For instance, the RRM measurement may include measurement used for determining whether to perform a handover by a user equipment.

The RRM measurement may include such measurement as RSRP (reference signal received power), RSRQ (reference signal received quality), RSSI (received signal strength indicator) and the like.

The RSRP is defined by a linear average of power of a resource element carrying a CRS (cell-specific reference signal) in a measured frequency bandwidth. A user equipment can determine the RSRP by detecting a cell-specific RS (CRS), which is transmitted in a manner of being mapped to a specific resource element. When the RSRP is calculated, a cell-specific reference signal (R0) for an antenna port 0 can be basically used. If a user equipment is able to reliably detect a cell-specific reference signal (R1) for an antenna port 1, the RSRP can be determined by using the R1 in addition to the R0. Detailed content on the cell-specific reference signal may refer to the explanation explained with reference to FIG. 7 and a standard document (e.g., 3GPP TS36.211).

In order to get the RSRQ, the RSRP is multiplied by the number of resource blocks (N) within a measured frequency bandwidth and then a result of the multiplication is divided by 'E-UTRA carrier RSSI' (i.e., RSRQ=N×RSRP/(E-UTRA carrier RSSI)). The numerator (N×RSRP) and the denominator (E-UTRA carrier RSSI) are measured for an identical resource block set.

The 'E-UTRA carrier RSSI' includes a linear average of the total received power measured by a user equipment in OFDM symbols only including a reference symbol for an antenna port 0 (i.e., a CRS for an antenna port 0) in a measured bandwidth for a signal received from all sources including a common-channel serving cell, a non-serving cell, contiguous channel interference, a thermal noise and the like.

'UTRA FDD carrier RSSI' is defined by received wideband power including a noise generated in a receiver and thermal noise within a bandwidth defined by a receiver pulse forming filter.

'UTRA TDD carrier RSSI' is defined by received wideband power including a noise generated in a receiver and thermal noise within a bandwidth defined by a receiver pulse forming filter in a specific time slot.

Beside the above-mentioned items, explanation on DL channel measurement may refer to a standard document (e.g., 3GPP TS36.214). For clarity, detail explanation on the DL channel measurement is omitted at this time. Yet, it is apparent that the contents on the DL channel measurement disclosed in the standard document can be applied to DL channel measurement used in the following various embodiments of the present invention.

FIG. 12 is a diagram for explaining a single carrier communication and a multi carrier communication. In particular, FIG. 12 (a) shows a subframe structure of a single carrier and FIG. 12 (b) shows a subframe structure of multiple carriers.

Referring to FIG. 12 (a), in general, a wireless communication system performs (in case of a FDD (frequency division duplex)) data transmission or reception via a single DL band and a single UL band corresponding to the DL band. Or, the wireless communication system divides a prescribed radio frame into an UL time unit and a DL time unit in time domain and performs (in case of a TDD (time division duplex) data transmission or reception via the UL/DL time unit. Yet, according to a recent wireless communication system, discussion on introducing a carrier aggregation (or bandwidth aggregation) technology, which uses a wider UL/DL bandwidth by aggregating a plurality of UL and/or DL frequency blocks to use a wider frequency band, is in progress. The carrier aggregation performs DL or UL communication using a plurality of carrier frequencies. On the contrary, an OFDM system performs DL or UL communication in a manner of carrying a basic frequency band, which is divided by a plurality of orthogonal sub carriers, on a single carrier frequency. Each of a plurality of the carriers aggregated by the carrier aggregation is called a component carrier (CC). Referring to FIG. 12 (b), a bandwidth of 60 MHz can be supported in a manner of aggregating three 20 MHz CCs in UL and DL, respectively. Each of the CCs can be contiguous or non-contiguous with each other in frequency domain. Although FIG. 12 (b) shows a case that a bandwidth of a UL CC and a bandwidth of a DL CC are identical to each other and symmetrical to each other for clarity, a bandwidth of each CC can be independently determined. And, asymmetrical carrier aggregation of which the number of UL CC and the number of Dl CC are different from each other can be configured as well. A DL/UL CC limited to a specific UE may be called a serving UL/DL CC configured for the specific UE.

An eNB can communicate with a UE in a manner of activating a part of the serving CCs or all of the serving CCs configured for the UE or deactivating a part of the CCs. The eNB may change a CC to be activated/deactivated and may change the number of activating/deactivating CCs. If the eNB cell-specifically or UE-specifically assigns available CCs to the UE, at least one or more CCs among the assigned CCs are not deactivated unless the CC assignment assigned to the UE is completely reconfigured or the UE makes a handover. As long as the CC assignment assigned to the UE is not completely reconfigured, a CC which is not deactivated is called a primary CC (PCC) and a CC capable of being freely activated/deactivated by the eNB is called a secondary CC (SCC). The PCC and the SCC can also be distinguished from each other on the basis of control information. For instance, specific control information can be configured to be transmitted and received via a specific CC only. In this case, the specific CC may be called the PCC and the rest of CC(s) can be called the SCC(s).

Meanwhile, 3GPP LTE (-A) uses a concept of a cell to manage a radio resource. A cell is defined as a combination of a pair of a DL resource (DL CC) and a UL resource (UL CC). A cell may be configured with a DL resource only or a combination of a DL resource and a UL resource. In case of supporting carrier aggregation, a linkage between a carrier frequency of a DL resource (DL CC) and a carrier frequency of a UL resource (UL CC) can be indicated by system information. For instance, a combination of the DL resource and the UL resource can be indicated by a system information block type 2 (SIB2) linkage. In this case, the carrier frequency means a center frequency of each cell or a CC. In the following description, a cell operating on a primary frequency is called a primary cell (PCell) or a PCC and a cell operating on a secondary frequency is called a secondary cell (SCell) or a SCC. A carrier corresponding to the PCell in DL is called a DL primary CC (DL PCC) and a carrier corresponding to the PCell in UL is called a UL primary CC (UL PCC). The SCell is configurable only after an RRC connection has been established. And, the SCell may be usable to provide an additional radio resource. According to capability of an UE, the SCell and the PCell may form a set of serving cells for the UE. A carrier corresponding to the SCell in DL is called a DL secondary CC (DL SCC) and a carrier corresponding to the SCell in UL is called a UL secondary CC (UL SCC). If carrier aggregation is not set to a UE although the UE is in an RRC-CONNECTED state or the UE does not support carrier aggregation, there exists a single serving cell only configured by the PCell.

Meanwhile, in the following description for explaining one embodiment of the present invention, assume that there exist a legacy UE including a legacy data channel, a control channel and an ACK/NACK channel and a new UE including a control channel and a data channel of a new structure and the new UE uses a structure of the legacy ACK/NACK channel as it is. In particular, since the new UE does not have ACK/NACK of a new structure, the new UE has a limitation of utilizing the legacy ACK/NACK. Although one embodiment of the present invention explains LTE system as an example, by which the present invention may be non-limited. It is apparent that the present invention is also applicable to all similar wireless communication systems.

In the following, in case that an eNB controls a UE using a control channel of a new structure in a wireless communication system according to one embodiment of the present invention, one embodiment of the present invention proposes a method of transmitting an ACK/NACK signal for a data channel of a new structure or how to inform the ACK/NACK signal for the data channel of the new structure.

As an example, LTE system is explained. A legacy LTE Rel-10 system includes PDCCH, PUSCH and PHICH. On the contrary, according to Rel-11 system, an eNB controls PUSCH of a UE via a UL grant format of e-PDCCH. In this case, if Rel-10 UE and Rel-11 UE are mixed in a cell, ACK/NACK for PDCCH-PUSCH targeting the Rel-10 UE and ACK/NACK for e-PDCCH-PUSCH targeting the Rel-11 UE should be transmitted at the same time. Hence, there may exist a chance of shortage of PHICH resource. In a normal situation, when a PHICH group includes an identical PUSCH lowest RB index, there may exist maximum 8 PHICH groups different from each other according to a DMRS CS. Yet, in such a situation as a CoMP scenario 4, the number of PHICH is restricted to a number less than 8 due to big interference situating at a PDCCH region and a problem that UEs exceeding the restricted number of UEs are unable to transmit PUSCH may occur. In a situation that there exists a limitation on the number of PHICH, if the number of UEs exceeding available PHICH resource operate to receive the PHICH, possibility of transmitting incorrect ACK/NACK information may increase due to the shortage of the PHICH resource. Consequently, possibility of performing abnormal operation of a UE may increase. An example of the abnormal operation may include a case in the following. If a UE misses a UL grant transmitted via PDCCH/e-PDCCH, an eNB may transmit unintended PUSCH based on incorrect information of PHICH.

In a carrier aggregation situation that combines a plurality of CCs with each other, an interference level granted to PHICH can be differently managed according to each CC. If very strong interference (e.g., strong interference originated from PDCCH of an adjacent macro eNB of high power) occurs on PHICH of a specific CC, similar to the aforementioned case, there may exist a chance of transmitting incorrect ACK/NACK information via the PHICH. One embodiment of the present invention designed to solve the aforementioned problem is explained with reference to FIG. 13 and FIG. 14 in the following.

Figure 13:
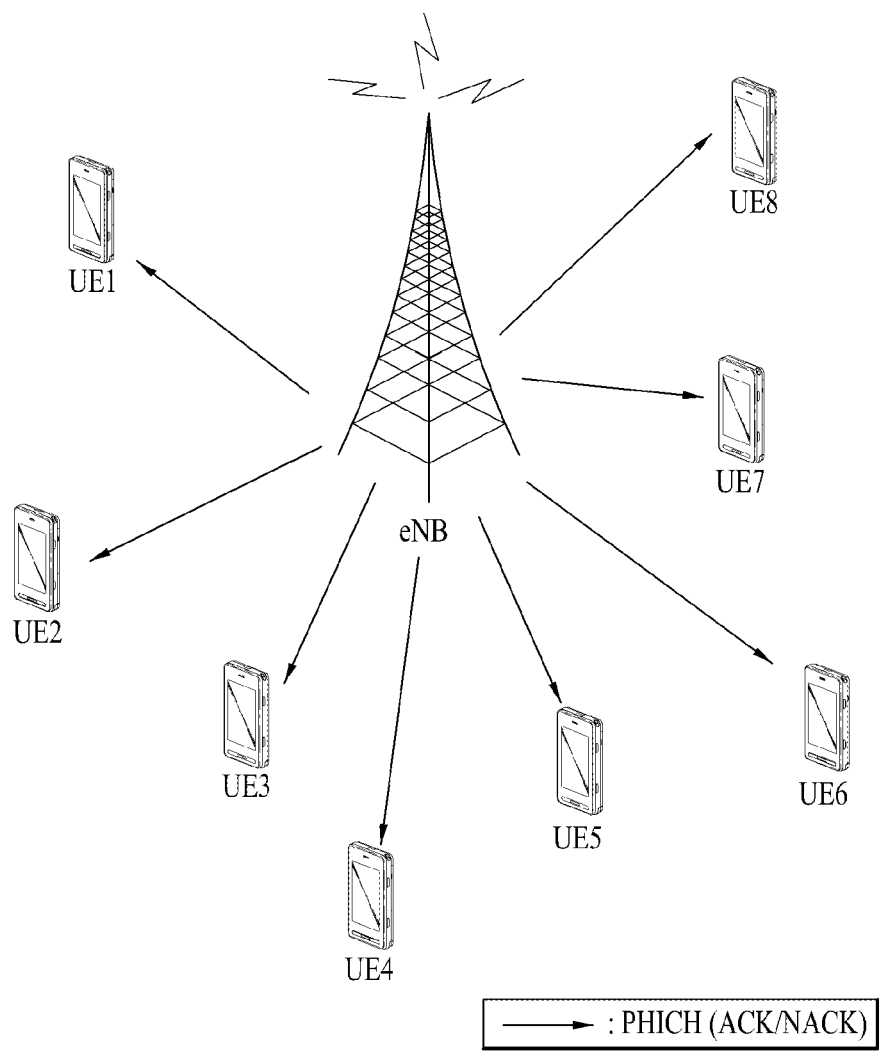
FIG. 13 is a diagram for a case that a PHICH resource is not deficient for a plurality of UEs existing in a cell according to one embodiment of the present invention.

FIG. 13 is a diagram for a case that a PHICH resource is not deficient for a plurality of UEs existing in a cell according to one embodiment of the present invention.

Referring to FIG. 13, assume that a UE 1 to a UE 8 are performing communication with a single eNB and the eNB has PHICH resources sufficient enough to allocate the resources to all of the UE 1 to the UE 8. The eNB can transmit ACK/NACK via PHICH in response to UL transmission received from each of the UE 1 to the UE 8.

FIG. 14 is a diagram for a method of solving a problem capable of being occurred when a PHICH resource is deficient according to one embodiment of the present invention. In examples shown in FIGS. 14 (a) and (b), assume that the number of PHICH resource capable of being allocated corresponds to 6.

In order to solve the aforementioned problem, one embodiment of the present invention divides a plurality of Rel-11 UEs existing in a cell into a UE configured to detect PHICH and a UE configured not to detect the PHICH. By doing so, it may not allocate a PHICH resource to the UE configured not to detect the PHICH. One embodiment of the present invention proposes that an eNB makes the UE configured not to detect the PHICH not detect the PHICH via a separate signal.

As shown in FIG. 14 (a), the eNB designates a UE 1 to a UE 6 as the UE configured to detect the PHICH and can designate a UE 7 and a UE 8 as the UE configured not to detect the PHICH. And, the eNB can indicate whether to detect the PHICH to each of the UE 1 to the UE 8.

As shown in FIG. 14 (b), the UE 1 to the UE 6, which is designated as the UE configured to detect the PHICH, receives the PHICH from the eNB. On the contrary, the UE 7 and the UE 8, which are designated as the UE configured not to detect the PHICH, do not receive the PHICH from the eNB. The UE indicated not to detect the PHICH checks whether an NDI field of e-PDCCH is toggled while omitting reception of the PHICH and may be then able to identify a new transmission or a retransmission. As a different meaning, the UE indicated not to detect the PHICH always assumes that ACK is transmitted via the PHICH at a point on which PHICH detection is omitted and may be then able to operate not to make retransmission via the PHICH.

In the foregoing description explained with reference to FIG. 14 (a), a plurality of UEs are divided into the UE configured to detect PHICH and the UE configured not to detect PHICH. A criteria of the division is explained in the following.

A Criteria of Whether to Detect PHICH

As an example of a criterion distinguishing a UE configured to detect PHICH from a UE configured not to detect PHICH, an eNB analyzes an RLF (radio link failure) history, which is determined based on joint decoding performance of PCFICH-PDCCH on a CC of a specific Rel-11 UE. Or, the eNB analyzes CQI or RSRQ feedback information and may be then able to indicate Rel-11 UEs of a CC less than a specific value not to detect PHICH. And, the Rel-11 UE consistently monitors PHICH of the Rel-11 UE. If BLER (block error ratio) performance is degraded, the Rel-11 UE may ask an eNB to make the Rel-11 UE stop detecting PHICH via a specific medium.

As a different criterion determining whether to detect PHICH, in case that many UEs (including the Rel-10 UE and the Rel-11 UE) exceeding the number of available PHICH resources are requesting PHICH at the same time in a cell in such a situation as a CoMP scenario 4 situation (i.e., in case that a plurality of PUSCHs of an identical lowest RB index value are transmitted more than a PHICH resource limit), since resource of PHICH is deficient, it is able to designate Rel-11 UEs receiving e-PDCCH not to detect the PHICH.

If Rel-11 UEs do not detect PHICH, the aforementioned methods following the two criteria do not need to monitor a PDCCH region. This is because a channel situation is not good that much. Hence, it does not need to detect PHICH nor PCFICH. As a different meaning, if a UE is configured to identify a start point of PDSCH not by detecting PCFICH but by a separate signaling, the UE operates in a manner of automatically not receiving PCFICH.

After a plurality of UEs are divided into a UE configured to detect PHICH and a UE configured not to detect PHICH, it is necessary for an eNB to indicate each UE whether to detect PHICH. In the following, a method for an eNB to indicate a UE whether to detect PHICH is explained.

Method of Indicating Whether to Detect PHICH—Embodiment 1

As a first embodiment for an eNB to indicate whether to detect PHICH, it may use an RRC (radio resource control) signal. If an eNB indicates to detect PHICH on a specific CC and a specific subframe via the RRC signal, UEs receiving the RRC signal can detect PHICH in the specific subframe of the specific CC. On the contrary, if the eNB indicates not to detect PHICH via the RRC signal, the UEs receiving the RRC signal may not detect PHICH.

A method for an eNB to designate a specific subframe of a specific CC is additionally explained. Interference on PHICH of a specific CC may vary according to a subframe. This is because a neighboring eNB interfering the PHICH of the specific CC performs an operation of reducing transmit power in a part of promised subframe for interference coordination. For a subframe of which transmit power is reduced, PHICH can be received because interference is reduced. On the contrary, for a subframe of which a transmit power reducing operation is not performed, it may be difficult to receive PHICH because interference still exists. Hence, the eNB can designate a specific subframe of a specific CC capable of receiving PHICH based on addition or subtraction of transmit power which is performed according to a subframe.

Method of Indicating Whether to Detect PHICH—Embodiment 2

As a second embodiment of indicating whether to detect PHICH, a cyclic shift (CS) value of 3-bit DMRS of a UL grant can be used as a PHICH detection/non-detection indicator. When the number of available PHICH resources is restricted to a number less than 8 due to severe interference in a PDCCH region, this method may be useful because PUSCH of a UE can be supported up to 8.

For instance, in a CoMP scenario 4 situation, assume that the number of available PHICH corresponds to 6 due to the impact of interference (identical to a situation shown in FIG. 14 (b)). As shown in an example 1 of Table 7 in the following, it may indicate whether to detect PHICH and a CS value at the same time via a CS field of e-PDCCH. In particular, all of the 6 available PHICHs can be used without any overhead while 8 PUSCHs of UEs are supported. In this case, although a CDM order is changed, reception and transmission capability of the UEs is not affected.

TABLE 7

| CS for DMRS field in DCI format 0 | Example 1 | Example 2 |
| --- | --- | --- |
| 000 | CS/PHICH detection | CS/PHICH detection |
| 001 | CS/PHICH detection | CS/PHICH detection |
| 010 | CS/PHICH detection | CS/PHICH detection |
| 011 | CS/PHICH detection | CS/PHICH detection |
| 100 | CS/PHICH detection | CS/NO PHICH detection |
| 101 | CS/PHICH detection | CS/NO PHICH detection |
| 110 | CS/NO PHICH detection | CS/NO PHICH detection |
| 111 | CS/NO PHICH detection | CS/NO PHICH detection |

In a first example of Table 7, if an eNB indicates a CS value 000 to 101 to a UE 1 to a UE 6, the UE 1 to the UE 6 can be indicated to detect not only a CS value but also PHICH. Similarly, if the eNB indicates a CS value 110 and 111 to a UE7 and a UE 8, the UE 7 and the UE 8 can be indicated not to detect the CS value and the PHICH.

Method of Indicating Whether to Detect PHICH—Embodiment 3

As a third embodiment of indicating whether to detect PHICH, it may utilize a MCS field value of a DCI format 0. When a MCS value is low, it means that a channel situation is not good. Hence, if the MCS field value is lower than a specific level, it is able to make a UE not detect PHICH. For instance, it is able to make a promise not to perform PHICH detection in a QPSK situation in advance. If a UE identifies the QPSK situation based on a received MCS level, the UE may not perform the PHICH detection. Table 8 in the following shows PHICH detection indicators via MCS.

TABLE 8

| MCS index | Modulation | Example 1 | Example 2 |
| --- | --- | --- | --- |
| 0-9, 29 | QPSK | NO detection | No detection |
| 10-16, 30 | 16QAM | Detection | No detection |
| 17-28, 31 | 64QAM | Detection | Detection |

In case of an Example 1, when an MCS index value delivered to a specific UE corresponds to 0-9, 29, the specific UE can be indicated not to detect PHICH while performing modulation by applying a QPSK scheme.

Method of Indicating Whether to Detect PHICH—Embodiment 4

As a fourth embodiment of indicating whether to detect PHICH, if a Rel-11 UE is designated to perform blind decoding (BD) on PDCCH in a specific subframe of a specific CC, it may make a promise to automatically perform PHICH detection. Specifically, a common search space of the Rel-11 UE exists in a PDCCH region of a PCell. In case of performing BD on the common search space, it may make a promise to automatically detect PHICH existing in the PDCCH region. And, in case of a SCell, it may also have a chance to perform BD on a PDCCH region of the SCell. In this case, it may also make a promise to automatically detect PHICH existing in the PDCCH region of the SCell.

Figure 15:
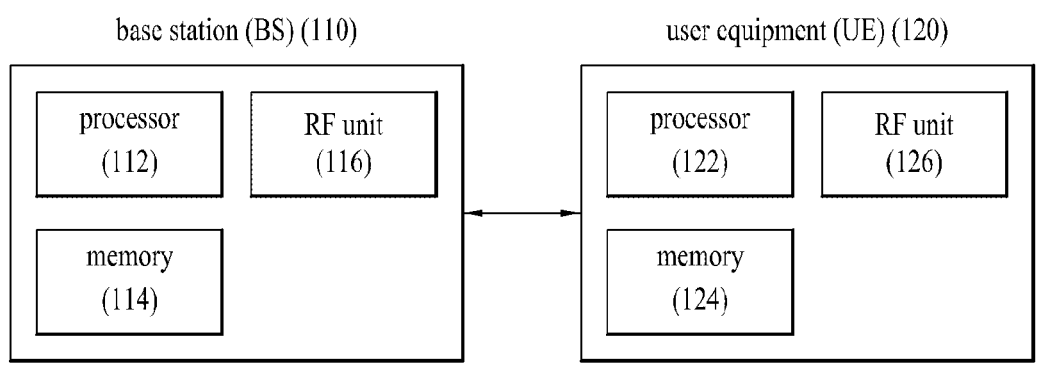
FIG. 15 is a diagram for a configuration of a transceiver according to the present invention.

FIG. 15 is a diagram for a configuration of a transceiver according to the present invention. in case of a system including a relay, an eNB or a UE can be replaced with the relay.

Referring to FIG. 15, a wireless communication system includes a base station (BS) 110 and a user equipment (UE) 120. The base station 110 includes a processor 112, a memory 114 and a radio frequency (RF) unit 116. The processor 112 can be configured to implement a procedure and/or methods proposed by the present invention. The memory 114 is connected with the processor 112 and stores various information related to operations of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement a procedure and/or methods proposed by the present invention. The memory 124 is connected with the processor 122 and stores various information related to operations of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In the present document, embodiments of the present invention mainly concern transmission and reception relation between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like. And, a terminal may be substituted with such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

The present invention can be actualized by a specific form within a scope not deviating a spirit and essential characteristic of the present invention. Hence, the aforementioned detail explanation should not be considered as restrictive but exemplary. The scope of the present invention should be determined by rational interpretation of attached claims and all changes within an equivalent scope of the present invention are included in the scope of the present invention. Therefore, the present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

Embodiments of the present invention can be used for an eNode B, a relay, a user equipment and other device in a wireless communication system.

What is claimed is:

1. A method of retransmitting an uplink data retransmitted by a user equipment based on a signal received via a physical hybrid automatic repeat request (HARQ) indicator channel (PHICH) in a wireless communication system, the method comprising:
   receiving an indication on whether to detect the PHICH from an eNode B;
   wherein the indication on whether to detect the PHICH is performed via a modulation coding scheme (MCS) value, and
   wherein the MCS value is contained in an uplink grant received from the eNode B;
   if the received indication corresponds to an indication configured to detect the PHICH, retransmitting the uplink data based on a detection result of the PHICH,
   wherein the received indication corresponds to the indication configured to detect the PHICH when the MCS value is less than a prescribed numerical value; and
   if the received indication corresponds to an indication configured not to detect the PHICH, retransmitting the uplink data based on the uplink grant received from the eNode B,
   wherein the received indication corresponds to the indication configured not to detect the PHICH when the MCS value exceeds the prescribed numerical value.

2. The method of claim 1, wherein if the user equipment does not use the MCS value to indicate whether to detect the PHICH, the indication on whether to detect the PHICH is performed via a cyclic shift value for a demodulation reference signal (DM-RS), and
   wherein the cyclic shift value is contained in the uplink grant received from the eNode B.

3. The method of claim 2, wherein if the cyclic shift value corresponds to a value within a prescribed range, the indication on whether to detect the PHICH corresponds to the indication configured to detect the PHICH, and
   wherein if the cyclic shift value corresponds to a value outside of the prescribed range, the indication on whether to detect the PHICH corresponds to the indication configured not to detect the PHICH.

4. The method of claim 1, wherein if the user equipment does not use the MCS value to indicate whether to detect the PHICH, the indication on whether to detect the PHICH is performed via a radio resource control (RRC) signal received from the eNode B.

5. The method of claim 4, wherein if the RRC signal indicates to detect the PHICH, the method further comprises the steps of:
   receiving an indication on a prescribed component carrier (CC) and a prescribed subframe from the eNode B; and
   detecting the PHICH in the prescribed subframe of the prescribed CC.

6. A user equipment for retransmitting an uplink data based on a signal received via a physical hybrid automatic repeat request (HARQ) indicator channel (PHICH) in a wireless communication system, the user equipment comprising:
   a radio frequency (RF) unit; and
   a processor configured to:
      control the RF unit to receive an indication on whether to detect the PHICH from an eNode B,
      wherein the indication on whether to detect the PHICH is performed via a modulation coding scheme (MCS) value, and
      wherein the MCS value is contained in an uplink grant received from the eNode B;
      if the received indication corresponds to an indication configured to detect the PHICH, control the RF unit to retransmit the uplink data based on a detection result of the PHICH,
      wherein the received indication corresponds to the indication configured to detect the PHICH when the MCS value is less than a prescribed numerical value; and
      if the received indication corresponds to an indication configured not to detect the PHICH, control the RF unit to retransmit the uplink data based on a uplink grant received from the eNode B,
      wherein the received indication corresponds to the indication configured not to detect the PHICH when the MCS value exceeds the prescribed numerical value.

7. The user equipment of claim 6, wherein if the user equipment does not use the MCS value to indicate whether to detect the PHICH, the indication on whether to detect the PHICH is performed via a cyclic shift value for a demodulation reference signal (DM-RS), and
   wherein the cyclic shift value is contained in the uplink grant received from the eNode B.

8. The user equipment of claim 7, wherein if the cyclic shift value corresponds to a value within a prescribed range, the indication on whether to detect the PHICH corresponds to the indication configured to detect the PHICH, and
   wherein if the cyclic shift value corresponds to a value outside of the prescribed range, the indication on whether to detect the PHICH corresponds to the indication configured not to detect the PHICH.

9. The user equipment of claim 6, wherein if the user equipment does not use the MCS value to indicate whether to detect the PHICH, the indication on whether to detect the PHICH is performed via a radio resource control (RRC) signal received from the eNode B.

* * * * *